(12) United States Patent
Abe

(10) Patent No.: US 7,458,607 B2
(45) Date of Patent: Dec. 2, 2008

(54) AIRBAG AND AIRBAG APPARATUS

(75) Inventor: Kazuhiro Abe, Tokyo (JP)

(73) Assignee: Takata Corporation, Tokyo (JP)

( * ) Notice: Subject to any disclaimer, the term of this patent is extended or adjusted under 35 U.S.C. 154(b) by 373 days.

(21) Appl. No.: 11/339,638

(22) Filed: Jan. 26, 2006

(65) Prior Publication Data
US 2006/0192371 A1 Aug. 31, 2006

(30) Foreign Application Priority Data
Feb. 25, 2005 (JP) ............................. 2005-051184
Apr. 21, 2005 (JP) ............................. 2005-123941

(51) Int. Cl.
*B60R 21/30* (2006.01)
(52) U.S. Cl. ................... 280/739; 280/743.1
(58) Field of Classification Search ............. 280/743.1, 280/743.2, 739, 740, 741
See application file for complete search history.

(56) References Cited

U.S. PATENT DOCUMENTS

| 5,603,526 A * | 2/1997 | Buchanan ................... 280/739 |
| 6,086,092 A | 7/2000 | Hill |
| 6,439,605 B2 * | 8/2002 | Ariyoshi ..................... 280/739 |
| 6,676,158 B2 * | 1/2004 | Ishikawa ................. 280/743.1 |
| 2003/0034637 A1 | 2/2003 | Wang et al. |
| 2005/0116455 A1 | 6/2005 | Abe et al. |
| 2007/0013177 A1 * | 1/2007 | Abe ........................... 280/739 |

FOREIGN PATENT DOCUMENTS

| JP | 2000016228 | 1/2000 |
| JP | 2000043674 | 2/2000 |
| JP | 2001-171456 | 6/2001 |
| JP | 2001277991 | 10/2001 |
| WO | WO98/00313 | 1/1998 |

* cited by examiner

*Primary Examiner*—Faye M. Fleming
(74) *Attorney, Agent, or Firm*—Manabu Kanesaka

(57) ABSTRACT

An inner part of an airbag is partitioned into a first chamber and a second chamber by first and second inner panels. In a rear panel, a venthole for allowing the second chamber to communicate with an outer part of the airbag is provided. A lid member covers the venthole and is combined with the rear panel in a vicinity of the venthole by a tear seam. The lid member is connected to the second inner panel by a tether. At an initial stage of airbag expansion, the venthole is covered by the lid member. When the airbag is expanded more than a predetermined amount, the lid member is stretched by the second inner panel via the tether, and released from the venthole so as to open the venthole. The airbag facilitates prompt deployment without a loss in shock-absorbing characteristics.

19 Claims, 28 Drawing Sheets

AIRBAG AND AIRBAG APPARATUS

BACKGROUND OF THE INVENTION AND RELATED ART STATEMENT

The present invention relates to an airbag and an airbag apparatus provided with a gas-discharging device such as a venthole or the like that absorbs a shock by discharging gas from an inner part of a chamber of the airbag toward outside of the chamber, and more particularly, to an airbag that is partitioned into a plurality of chambers in an inner part thereof. The invention further relates to an airbag apparatus provided with the airbag.

Hitherto, it is known that a shock applied to an occupant in a motor vehicle or the like is absorbed by providing a venthole in an airbag and discharging gas from an inner part of the airbag via the venthole, when the occupant in the motor vehicle or the like hits the expanded airbag.

Japanese Unexamined Patent Application Publication No. 2000-16228 describes an airbag configured such that the venthole is covered with a lid member until gas-pressure of the inner part of the airbag reaches a predetermined pressure and when the gas-pressure exceeds the predetermined pressure, the lid member is pushed open by the gas pressure and the venthole is opened.

Further, in Japanese Unexamined Patent Application Publication No. 2000-16228, an airbag for use in a driver-side seat of a motor vehicle is described. The airbag described in Japanese Unexamined Patent Application Publication No. 2000-16228 is formed by stitching each of peripheral edge portions of two sheet members (panels) both having a round shape, and an entire airbag forms one chamber. A venthole is provided in the sheet member at a side of the airbag opposite to a side of an occupant in the motor vehicle and the lid member is provided in a manner so as to cover the venthole.

In Japanese Unexamined Patent Application Publication No. 2000-16228, when the airbag is expanded, the venthole is covered with the lid member until the gas pressure of the inner part of the airbag reaches the predetermined pressure. Because the gas is limited to be discharged from the venthole, the gas pressure of the inner part of the airbag promptly rises to become relatively high pressure and the airbag is promptly developed.

Furthermore, when the gas pressure of the inner part of the airbag exceeds the predetermined pressure, because the lid member is pushed open and the venthole is opened, the gas is discharged from the inner part of the airbag via the venthole when the occupant in the motor vehicle hits the expanded airbag. Thereby, the shock applied to the occupant in the motor vehicle is absorbed.

Accordingly, an object of the present invention is to realize a prompt development of the airbag without losing shock-absorbing characteristics, even in the airbag that is partitioned into a plurality of chambers in an inner part thereof.

Further objects and advantages of the invention will be apparent from the following description of the invention and the associated drawings.

SUMMARY OF THE INVENTION

An airbag according to a first embodiment of the invention is partitioned into a plurality of chambers in an inner part thereof including a gas-discharging device for absorbing a shock by discharging gas from at least any one of the chambers to an outside of the chamber. The airbag further includes a limiting device for limiting the discharging operation of the gas performed by the gas-discharging device until the chamber is expanded more than a predetermined amount.

In one aspect of the invention, the gas-discharging device is a venthole, and the limiting device is a lid member for allowing the venthole to be closed, or to be opened a small amount until the chamber is expanded more than the predetermined amount. When the chamber is expanded more than the predetermined amount, the venthole closure is released so that the venthole is largely open.

In another aspect of the invention, the lid member covers the venthole and the lid member is combined in a releasable combination with a vicinity of the venthole. The airbag includes a panel for partitioning the inner part of the airbag into a plurality of chambers at the inner part of the airbag, and the panel is connected to the lid member. When the airbag is expanded more than the predetermined amount, the lid member is stretched by the panel resulting in releasing the combination of the lid member with the vicinity of the venthole. As a result, the venthole is uncovered, and is largely open.

In another aspect of the invention, the lid member covers the venthole, the airbag includes a panel for partitioning the inner part of the airbag into the plurality of chambers, and the panel is connected to the lid member. When the airbag is expanded more than the predetermined amount, the lid member is stretched and retreated from the venthole, thereby allowing the venthole closure to be released so that the venthole is largely open.

In another aspect of the invention, the venthole is extended lengthwise in a retreating direction of the lid member.

In another aspect of the invention, the gas-discharging device is a venthole formed in a groove-like shape or an elongated hole shape having a pair of longitudinal sides. The airbag includes a panel for partitioning the inner part of the airbag into a plurality of chambers at the inner part of the airbag, and the panel is connected to a middle part of one side of the longitudinal sides of the venthole. When the airbag is expanded more than the predetermined amount, the middle part of one side of the longitudinal sides of the venthole is stretched by the panel, thereby opening the venthole a large amount.

In another embodiment of the invention, an airbag apparatus includes an airbag according to the invention and an inflator for supplying gas to the airbag.

In one embodiment of the invention, an airbag apparatus includes an airbag partitioned into a plurality of chambers in an inner part thereof, a retainer with the airbag attached thereto, a gas-discharging device provided in the retainer, being communicated with at least any one of chambers, and an inflator for supplying gas into the airbag. The airbag apparatus is further characterized in being configured to absorb a shock by discharging gas to an outside of the airbag via the gas-discharging device. The airbag apparatus further includes a limiting device for limiting the discharging operation of the gas performed by the gas-discharging device until the chamber is expanded more than a predetermined amount.

In another embodiment of the airbag apparatus, the gas-discharging device is an opening provided in the retainer, and the limiting device is a lid member that allows the opening to be closed, or to be open a small amount, until the chamber is expanded more than the predetermined amount. When the chamber is expanded more than the predetermined amount, the venthole closure is released so that the venthole is largely open.

In another embodiment of the airbag apparatus, the lid member covers the opening, and the airbag apparatus includes a lid member moving device for moving the lid member to open the opening, or to allow the opening to be open a large amount when the airbag is expanded more than the predetermined amount.

In one embodiment of the airbag apparatus, the lid member moving device includes a gas generator for moving the lid member by applying gas pressure to the lid member.

In the present invention, an airbag is configured to be partitioned into a plurality of chambers in an inner part thereof, and is provided with a gas-discharging device that absorbs shock by allowing gas to be discharged from at least any one of the chambers to an outside of the chamber (to an outside the airbag or to the other chamber).

In the airbag and airbag apparatus according to the invention, because the gas-discharging operation performed by the gas-discharging device is limited until the chamber is expanded more than the predetermined amount, the chamber is promptly brought to have high internal pressure and deployment of the airbag is promoted (i.e., made to occur promptly). In addition, when the chamber is expanded more than the predetermined amount, because the limitation for the gas-discharging operation is released, the gas is discharged from the inner part of the chamber to the outside thereof by the gas-discharging device, and the shock is sufficiently absorbed.

In the configuration of the airbag in which the gas-discharging device is a venthole and the venthole is provided with a lid member for allowing the venthole to be closed or to be open a small amount until the chamber is expanded more than the predetermined amount, the lid member allows the venthole to be largely open when the chamber is expanded more than the predetermined amount. In this configuration, the gas discharged from the chamber can be controlled by a simple structure.

In this case, a panel for partitioning the inner part of the airbag and the lid member is connected, and the lid member is stretched by the panel when the airbag is expanded more than the predetermined amount, and a combination of the lid member with a vicinity of the venthole is thereby released. In the thus configured airbag, when expanded, the closure of the venthole is securely released so that the venthole is largely open.

In one configuration of the airbag, when the airbag is expanded more than the predetermined amount, the lid member retreats from the venthole by being stretched by the panel that partitions the inner part of the airbag. Accordingly, the closure of the venthole is securely released or the venthole is opened a large amount, when the airbag is expanded more than the predetermined amount.

In this case, because the venthole is configured to have an elongated form in a retreating direction of the lid member, the opening amount (the opening area) gradually increases along with the retreating operation of the lid member from the venthole caused by expansion of the airbag. Accordingly, the opening amount of the venthole, i.e., the amount of the gas being discharged from the venthole, can be minutely controlled corresponding to the expanding amount of the airbag.

In another embodiment of the airbag, the venthole is formed in a groove-like shape or an elongated-hole shape, and the venthole has a relatively small opening amount until the airbag is expanded more than the predetermined amount. In addition, when the airbag is expanded more than the predetermined amount, a middle portion of one of the longitudinal sides of the venthole is stretched by the panel that partitions the inner part of the airbag. The one longitudinal side of the venthole is separated from the other longitudinal side thereof, resulting in a large opening amount of the venthole. In this configuration of the airbag, the venthole is also controlled securely to have a large opening amount, when the airbag is expanded more than the predetermined amount.

In one embodiment of the airbag apparatus, a gas-discharging device that is communicated with at least one chamber in the airbag is provided in a retainer attached to the airbag. In the airbag apparatus, because the gas-discharging operation performed by the gas-discharging device is limited until the chamber is expanded more than the predetermined amount, the chamber is also promptly brought to have high internal pressure and the deployment of the airbag is promoted (made to occur promptly). In addition, because the limitation is released when the chamber is expanded more than the predetermined amount, the gas is discharged from the inner part of the chamber to the outside of the airbag by the gas-discharging device and the shock is sufficiently absorbed.

In another embodiment of the airbag apparatus, the gas-discharging device is an opening provided in the retainer and a lid member is provided to allow the opening to be closed or to be opened a small amount until the chamber is expanded more than the predetermined amount, and to allow the opening for the closure to be released or to allow the opening to be opened a large amount when the chamber is expanded more than the predetermined amount. In this configuration, the amount of the gas discharged from the chamber can be controlled by a simple configuration.

In this case, a lid member moving device for moving the lid member when the airbag is expanded more than the predetermined amount is provided so as to allow the opening to be open or to be opened a large amount. The opening is thereby securely allowed to be opened or to be largely open when the airbag is expanded more than the predetermined amount.

As for the lid member moving device, the lid member moving device configured to move the lid member by applying the gas pressure from a gas generator is simple and preferable. However, the configuration of the lid member moving device is not limited to the above-described embodiment.

DETAILED DESCRIPTION OF THE PREFERRED EMBODIMENTS

Hereinbelow, embodiments of the present invention are explained with reference to the drawings.

Figure 1:
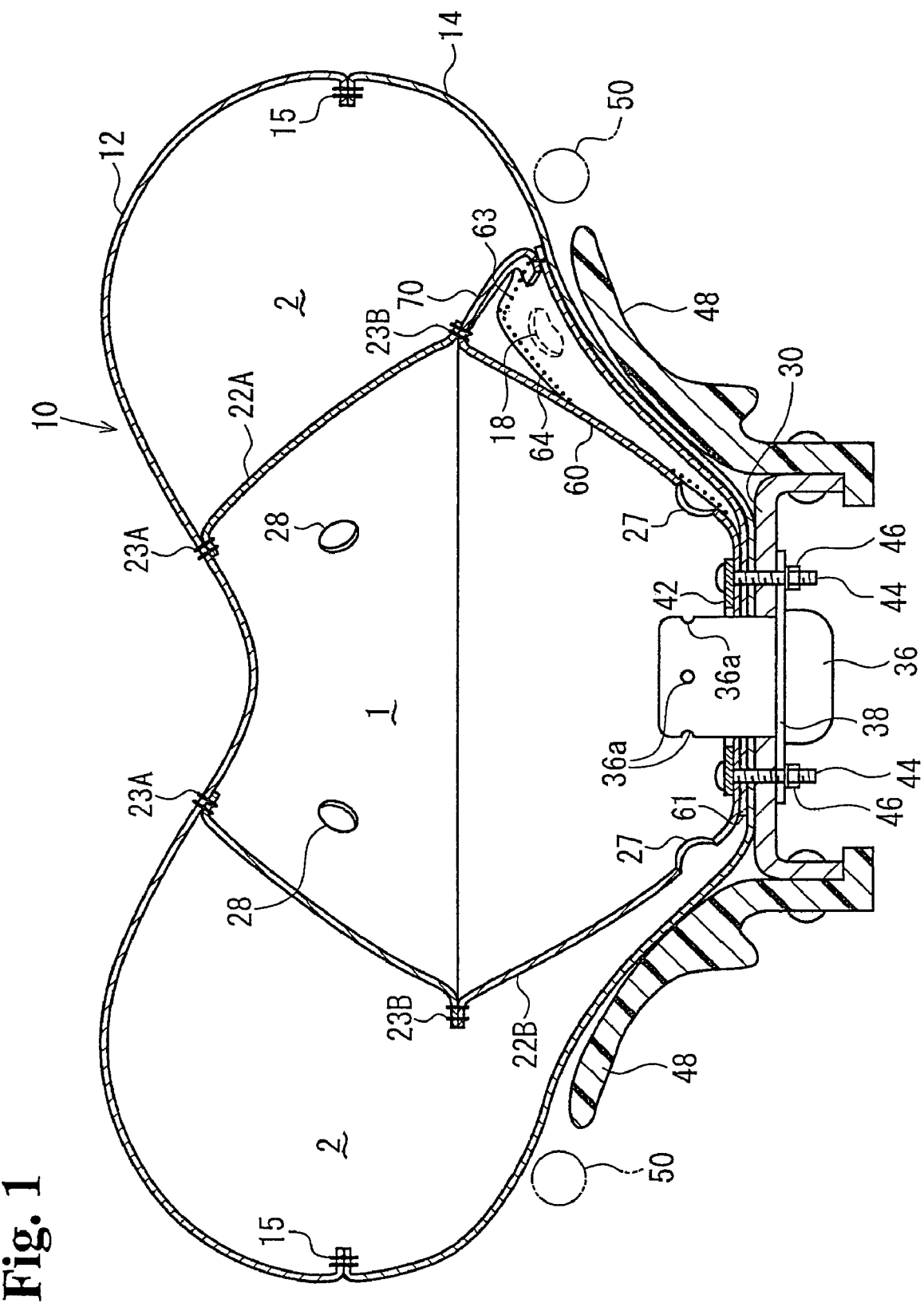
FIG. 1 is a cross-section illustrating an airbag and an airbag apparatus according to a first embodiment of the invention in the middle of an expansion of the airbag.
Figure 2:
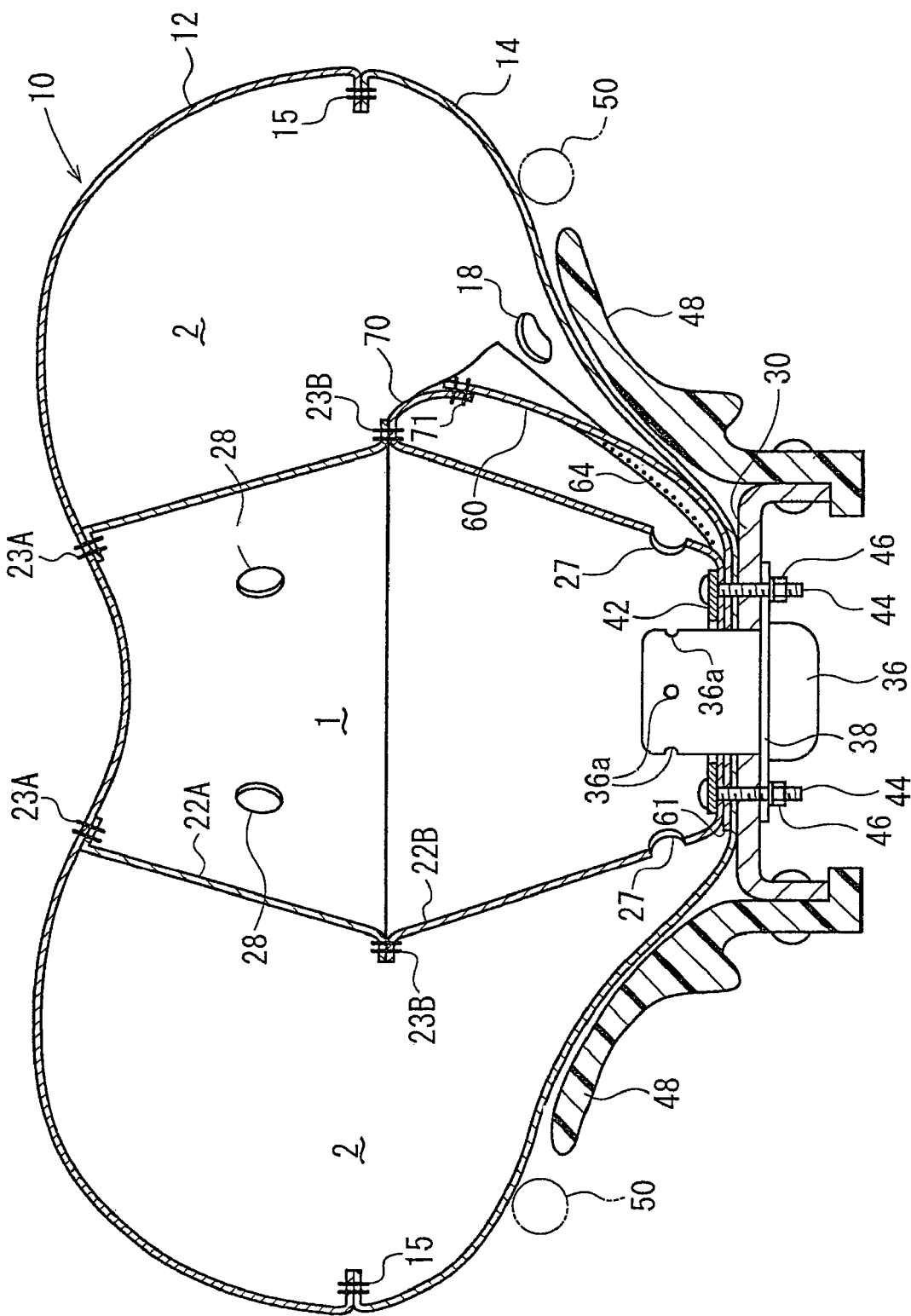
FIG. 2 is a cross-section illustrating the airbag and the airbag apparatus of FIG. 1 on completion of the expansion of the airbag.
Figure 3:
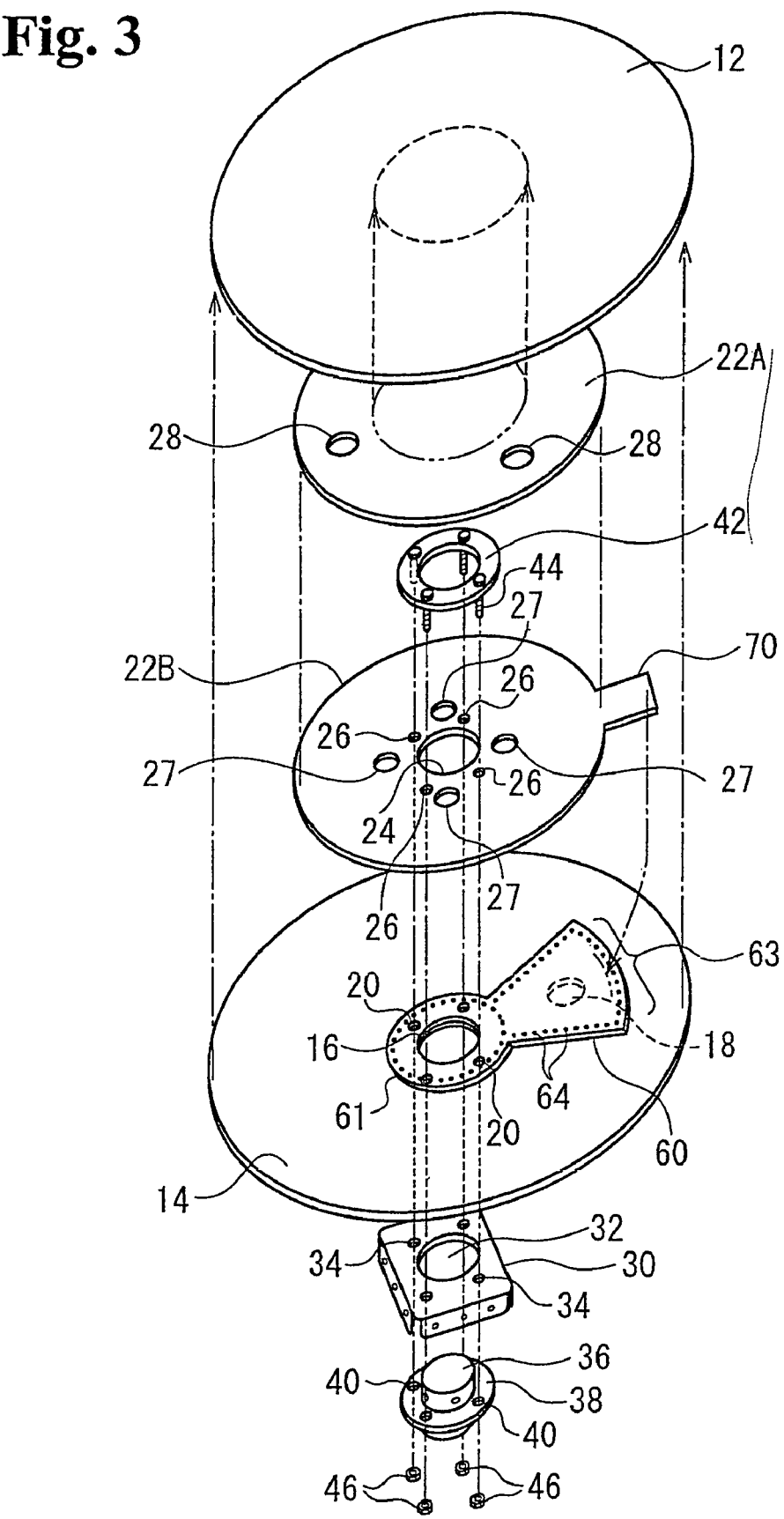
FIG. 3 is an exploded perspective view illustrating the airbag and the airbag apparatus of FIG. 1.
Figure 4:
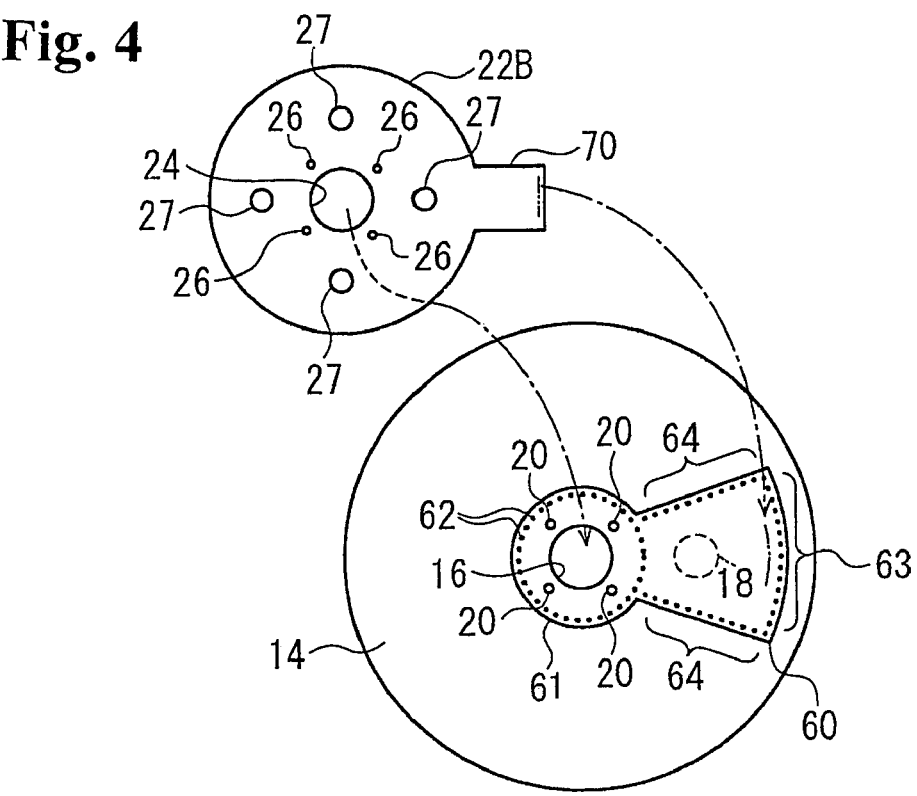
FIG. 4 is a plan view illustrating a rear panel and a second inner panel of the airbag of FIG. 1.

FIGS. 1 and 2 are cross-sections illustrating an airbag and an airbag apparatus for use in a driver-side seat of a motor vehicle according to a first embodiment of the invention. FIG. 3 is an exploded perspective view illustrating the airbag and the airbag apparatus of FIG. 1, and FIG. 4 is a plan view (exploded view) illustrating a rear panel and a second inner panel of the airbag of FIG. 1. Further, FIG. 1 illustrates the airbag in the middle of an expansion thereof and FIG. 2 illustrates the airbag on completion of the expansion thereof.

In this embodiment, an airbag 10 is the airbag for use in a driver-side seat of the motor vehicle.

The airbag 10 is provided with a front panel 12 for constituting a face of the airbag 10 facing an occupant, a rear panel 14 for constituting an outer face of the airbag 10 opposite to the side of the face facing the occupant, a first and a second inner panels 22A and 22B, for partitioning an inner part of the airbag 10 into a first chamber 1 and a second chamber 2, a venthole 18 serving as a gas-discharging device for discharging gas from the second chamber 2 to an outside of the airbag 10, a lid member 60 serving as a limiting device for limiting the gas to be discharged from the venthole 18, a tether 70 for connecting the lid member 60 to the inner panel 22B, or the like.

Each of the front panel 12, rear panel 14, and the first and the second inner panels 22A and 22B are made of round-shaped woven material.

The front panel 12 and the rear panel 14 have approximately the same diameter and each of the outer peripheral edges thereof is stitched together by a seam 15 to form a bag shape. The seam 15 is located along outer peripheries of the front panel 12 and the rear panel 14 in an annular fashion. The seam 15 is formed from thread, although it is not to be limited to thread.

In the rear panel 14, an opening for inflator (gas generator) 16 and the venthole 18 are provided. The opening for inflator 16 is disposed at a center of the rear panel 14. At a peripheral edge portion of the opening for inflator 16, a patch cloth 61 formed from annularly shaped woven cloth is attached from an inside of the airbag 10. A reference number 62 (in FIG. 4) denotes a seam for stitching the patch cloth 61 on the rear panel 14. The seam 62 is disposed along an outer periphery of the patch cloth 61 in an annular fashion. Around the opening 16, a bolt penetrating hole 20 that penetrates the patch cloth 61 and the rear panel 14 is formed. The venthole 18 is disposed at an area between an outer peripheral edge portion of the patch cloth 61 and an outer peripheral edge portion (seam 15) of the rear panel 14.

The lid member 60 is overlapped with the venthole 18 from inside of the airbag 10. In this embodiment, the lid member 60 is integrally formed with the patch cloth 61 and the lid member 60 is extending from the outer peripheral edge portion of the patch cloth 61 toward the outer periphery side of the rear panel 14 in a tongue-piece shaped fashion.

In the peripheral edge portions of the lid member 60, the peripheral edge portion thereof at a side of an outer periphery of the rear panel 14 (the peripheral edge portion of a tip end side of the lid member 60 in a direction extending from the patch cloth 61) is stitched on the rear panel 14 by a tear seam 63 (low-strength seam) to be ruptured and disunited, when a stretching force stronger than the predetermined strength is applied thereto. Further, a pair of peripheral edge portions thereof extending toward the outer periphery of the rear panel 14 from the outer peripheral edge portion of the patch cloth 61 is respectively stitched on the rear panel 14 by a seam 64 (high-strength seam) that is not ruptured even when the stretching force stronger than the predetermined strength is applied.

In addition, the seams 15 and 62, and seams 23A, 23B, and 71, described later, are also the same high-strength seam as the seam 64 and have combining strength so as not to be ruptured when the airbag is expanded.

As illustrated in FIG. 4, in this embodiment, each of the seams 64 is disposed extending in an approximately radial direction from the center of the rear panel 14 and one end of the seam 64 is joined to the seam 62 at a center side of the rear panel 14. The tear seam 63 is disposed extending in an approximately concentric fashion with the outer peripheral edge portion of the rear panel 14 and both end sides of the tear seam 63 are joined to the other ends of each of the seam 64. Further, the tear seam 63 and the other ends of each of the seams 64 are separated from the seam 15 of the outer peripheral side of the rear panel 14. The venthole 18 is located inside of a series of the tear seam 63, the seam 64, the tear seam 62, and the seam 64.

However, the configuration of the lid member 60 and the combination structure of the rear panel 14 are not limited to the above-described configuration. The lid member 60 may be provided in a separate body from the patch cloth 61. An entire periphery of the lid member 60 may be combined with the rear panel 14 by the tear seam 63. Further, each of the tear seam 63, the seam 64, the seam 62, and the seam 64 may not be disposed in series.

The first and the second inner panels 22A and 22B are provided in the inner part of the airbag 10. The first and the second inner panels 22A and 22B are disposed in a concentric fashion with the front panel 12 and the rear panel 14, and each of the outer peripheral edge portions is stitched together by a seam 23B. A center portion of the first inner panel 22A at a front panel 12 side (a portion to be an end portion of the occupant side of the inner panel 22A, when the airbag 10 is expanded) is stitched on a center portion of the front panel 12 by the seam 23A.

At a center portion of a second inner panel 22B of the rear panel 14 side (a portion to be an end portion of a rear side of the second inner panel 22B, when the airbag is expanded), an opening for inflator 24 to be disposed in an approximately concentric manner with the opening for inflator 16 of the rear panel 14 is provided. The openings for inflator 16 and 24 have an approximately the same diameter. A bolt penetrating hole 26 that is overlapped with the bolt penetrating hole 20 of the rear panel 14 is provided around the opening for inflator 24.

A continuous hole 27 for allowing the first chamber 1 to communicate with the second chamber 2 is provided relatively close to the opening for inflator 24 in the second inner panel 22B. Further, in the first inner panel 22A, an inner venthole 28 is provided in this embodiment.

A peripheral edge portion of the opening for inflator 24 of the second inner panel 22B is overlapped with a peripheral edge portion of the opening for inflator 16 of the rear panel 14 and is further overlapped with a peripheral edge portion of an inflator-attaching opening 32 of the retainer 30. In addition, peripheral edge portions of each of the openings for inflator 24 and 16 are fixed to the retainer 30 through the bolt penetrating holes 26 and 20. Consequently, the peripheral edge portion of the opening for inflator 24 of the second inner panel 22B is connected to the peripheral edge portion of the opening for inflator 16 of the rear panel 14, and each of the outer peripheral edge portions of the first and second inner panels 22A and 22B is connected together. As a result, the center portion of the first inner panel 22A is connected to the front panel 12.

By the first and the second inner panels 22A and 22B, the inner part of the airbag 10 is partitioned into the first chamber 1 at a center thereof and the second chamber 2 surrounding the first chamber 1. The first chamber 1 is located inside of the first and the second inner panels 22A and 22B.

In this embodiment, a continuous opening 27 is formed on an extension line in a gas blowing-out direction of an inflator 36, described later, which is disposed in the first chamber 1 via the openings for inflator 16 and 24, in other words, the continuous opening 27 is formed at a position facing a gas blowing outlet 36a of the inflator 36.

In this embodiment, as illustrated in FIG. 3, both the continuous opening 27 and the inner venthole 28 are four in number, respectively, and each of which is disposed in a peripheral direction of the airbag 10 at even distance. Further, a phase of each of the continuous openings 27 and inner ventholes 28 is displaced in a peripheral direction relative to a center of the airbag 10.

However, the number or the disposition of each of the continuous openings 27 and the inner ventholes 28 is not limited to the above-described configuration. For example, all of the continuous openings 27 may be facing the gas blowing outlet 36a of the inflator 36 or part of the continuous openings 27 may be facing the gas blowing outlet 36a. In addition, a continuous opening 27 that does not face the gas blowing outlet 36a may exist.

Further, a patch cloth or the like may be attached to a peripheral edge portion of the opening for inflator 24 or each of the continuous openings 27, the venthole 18 and the inner venthole 28.

In this embodiment, the second inner panel 22B and the lid member 60 are connected by the tether 70. In addition, the tether 70 is integrally formed with the second inner panel 22B and one end of the tether 70 is connected to an outer peripheral edge portion of the second inner panel 22B. The other end of the tether 70 is connected by a seam 71, to a vicinity of an edge portion of the lid member 60 (hereinafter referred to as combination-releasing edge portion) that is combined with the rear panel 14 by the tear seam 63.

However, the tether 70 may be integrally formed with the first inner panel 22A or the lid member 60, or may be separately formed from the same. In addition, the tether 70 may be connected to a portion in each of the first or the second inner panel 22A or 22B, other than the outer peripheral edge portion thereof.

In the retainer 30 for attaching the airbag 10, the inflator-attaching opening 32 is formed at the center thereof and a bolt penetrating hole 34 is disposed around the inflator-attaching opening 32.

The inflator 36 has an approximately cylindrical shape and the gas blowing outlet 36a is provided around the side peripheral face of a tip end side in an axial direction of the cylindrical shape. In this embodiment, the gas blowing outlet 36a is four in number and is disposed in a peripheral direction of the inflator 36 at even distance. The inflator 36 is configured such that the gas is blown out from the gas blowing outlet 36a in a radial direction. A flange 38 for fixing the inflator 36 is provided protruding from a middle portion in the axial direction of the inflator 36 (rear end side of the inflator 36 relative to the gas blowing outlet 36a). In the flange 38, a bolt penetrating hole 40 is formed. The tip end side of the inflator 36 is fit into the inflator-attaching opening 32.

When the airbag 10 is attached to the retainer 30, the peripheral edge portions of each of the opening for inflator 16 in the rear panel 14 and the opening for inflator 24 in the second inner panel 22B are pressed to a peripheral edge portion of the inflator-attaching opening 32 by a pressing ring 42. The tip end side of the inflator 36 that is fit into the inflator-attaching opening 32 is inserted into the inner part of the first chamber 1 via the openings for inflator 16 and 24. Each of the gas blowing outlets 36a of the tip end side of the inflator 36 respectively faces each of the continuous openings 27 of the second inner panel 22B.

At this moment, a stud bolt 44 of the pressure ring 42 penetrates the bolt penetrating holes 26, 20, 34, and 40 and by threading a nut 46 on a tip end of the stud bolt 44, the second inner panel 22B, the airbag 10, and the inflator 36 are fixed to the retainer 30. Further, by folding the airbag 10 and attaching a module cover 48 to the retainer 30 in a manner so as to cover the folded body of the airbag 10, the airbag apparatus is configured. The airbag apparatus is installed on the steering wheel 50 of the motor vehicle.

In the event that the motor vehicle encounters a crash or the like, the inflator 36 is activated and gas is blown out into the inner part of the airbag 10. The airbag 10 is expanded by the gas and pushes open the module cover 48, and protects the occupant seated on the driver-side seat by deploying in a cabin of the motor vehicle.

In the airbag 10, the venthole 18 is closed by the lid member 60 at an early stage of the expansion of the airbag 10.

Because the gas is not discharged from the venthole 18, pressure in the second chamber 2 is promptly brought to be in high internal pressure and the airbag 10 is promptly deployed.

Further, in this embodiment, because the continuous opening 27 is disposed on an extension line in the gas blowing out direction of the inflator 36, the gas from the inflator 36 is blown out toward a vicinity of the continuous opening 27 in a manner of a direct projection. Because the gas is then brought to flow into the second chamber 2 through the continuous opening 27, the gas blown out from the inflator 36 is brought to directly flow into the second chamber 2. Accordingly, the second chamber 2 is brought to be at a high inner pressure extremely early in the deployment. As a result, the airbag 10 is further promptly deployed.

When the airbag 10 is expanded to a predetermined amount, the tether 70 is brought to a state to be strained between the second inner panel 22B and the combination-releasing edge portion of the lid member 60, as shown in FIG. 1. In addition, when the airbag is further expanded, the tear seam 63 is ruptured, as shown in FIG. 2. Then the combination-releasing edge portion is torn off from the rear panel 14 resulting in opening the venthole 18.

When the occupant of the motor vehicle hits the airbag 10, the gas is discharged from the first chamber 1 to the second chamber 2 via the inner venthole 28 and the gas is further discharged from the second chamber 2 to the outside of the airbag 10 via the venthole 18, and a shock applied to the occupant of the motor vehicle is thereby absorbed.

In the embodiment described above, the second inner panel 22B is connected to the lid member 60 by one tether 70, however, the second inner panel 22B may be connected to the lid member 60 by more than one tethers 70.

Figure 5:
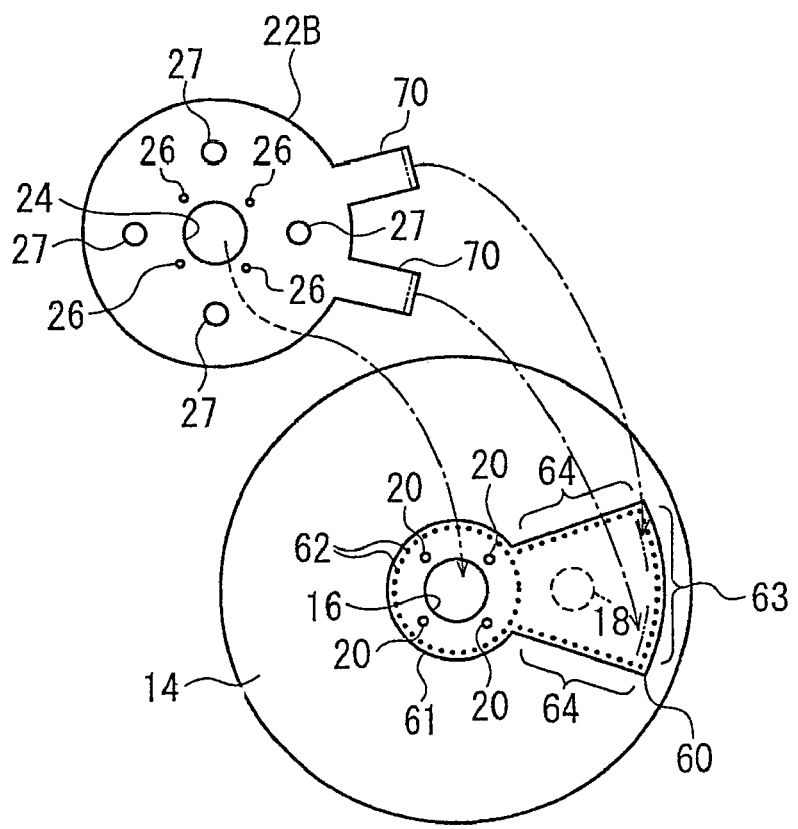
FIG. 5 is a plan view illustrating a rear panel and a second inner panel of an airbag according to a second embodiment.

In a second embodiment of the invention, shown in FIG. 5, two tethers 70, 70A are provided protruding from the outer peripheral edge portion of the second inner panel 22B in a peripheral direction thereof at a distance and a tip end of each of the tethers 70 is stitched on one half side and the other half side in the extending direction of the combination-releasing edge portion of the lid member 60.

In this second embodiment, the venthole 18 provided is one in number, however more than one ventholes may be provided. In this case, more than one venthole may be covered with one lid member 60.

Figure 6:
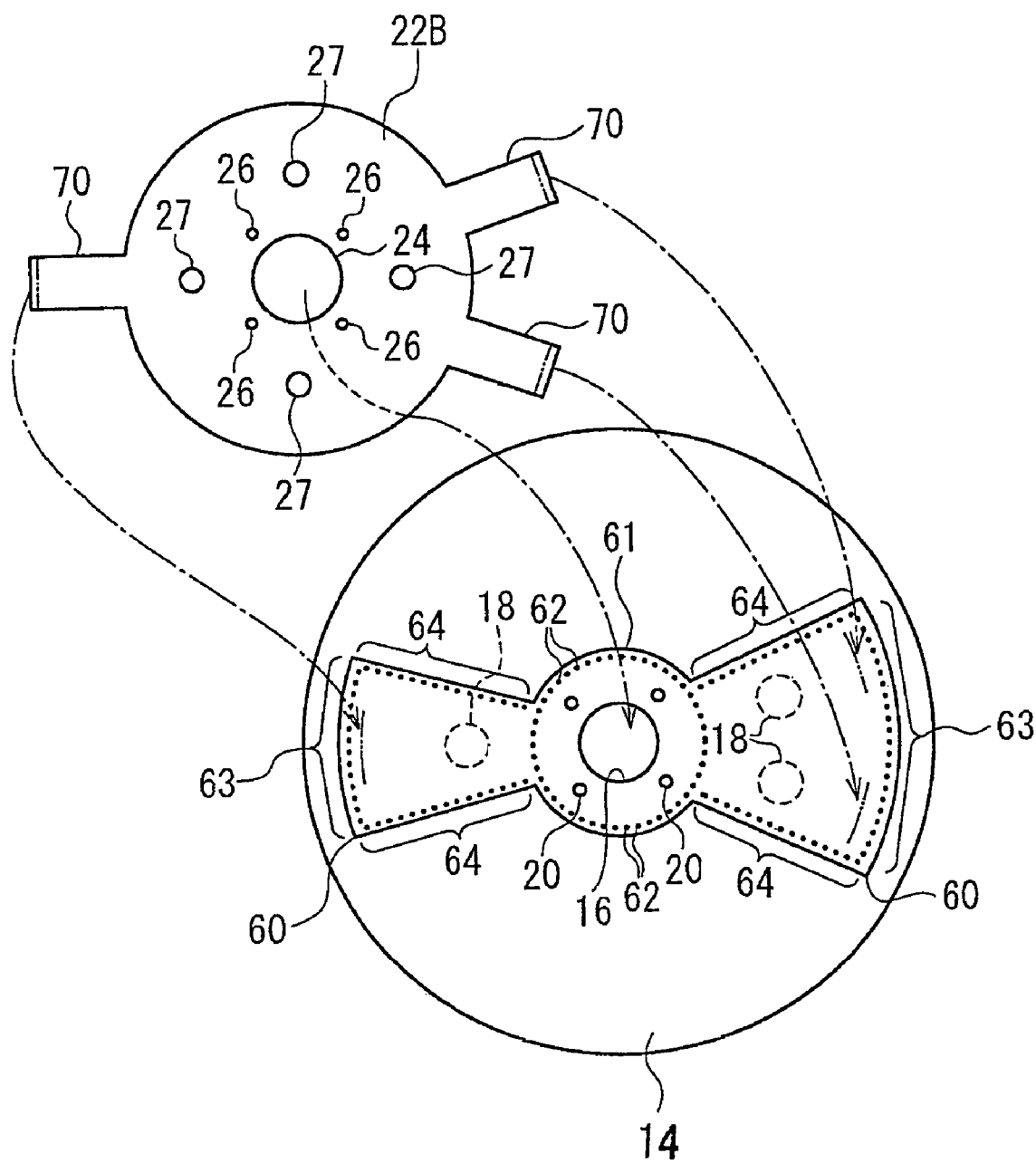
FIG. 6 is a plan view illustrating a rear panel and a second inner panel of an airbag according to a third embodiment.

In a third embodiment of the invention, shown in FIG. 6, two ventholes 18 and 18 are provided at one half side of the rear panel 14 and one venthole 18 is provided at the other half side thereof. The two ventholes 18 and 18 at the one half side are disposed in a neighboring positional relationship in a peripheral direction of the rear panel 14 at a distance apart. In this embodiment, the two ventholes 18 at the one half side are covered with one lid member 60 and the venthole 18 at the other half side is covered with the other lid member 60.

The lid member 60 at the one half side is formed to have a wide width in a peripheral direction of the rear panel 14 and is connected to the second inner panel 22B by two tethers 70 disposed in a peripheral direction at a distance apart. The lid member 60 at the other half side is formed to have a narrow width and is also connected to the second inner panel 22B by one tether 70.

Of course the number and the disposition of the venthole 18, the lid member 60, and the tether 70 may be configured to be other than that in the above-described embodiment.

In each of the above-described embodiments, the lid member 60 is provided at a position of the venthole 18 that allows the second chamber 2 to communicate with the outside of the airbag 10. However, the lid member 60 may be provided at a position of the inner venthole 28 that allows the first chamber 1 to communicate with the second chamber 2.

A combining device for combining the combination-releasing edge portion of the lid member 60 with the rear panel 14 is not limited to the tear seam 63. For example, an adhesive agent having low adhesive force, a sealing member, or the like may be applicable. In addition, the lid member 60 may be joined with the rear panel 14 by low strength knitting. The lid member 60 may be joined to both the rear panel 14 and the front panel 12.

The lid member 60 may be configured such that the lid member 60 partially covers the venthole 18 until the airbag 10 is expanded more than the predetermined amount. When the airbag 10 is expanded more than the predetermined amount, the venthole 18 is brought to be in a large opening amount.

Figure 7:
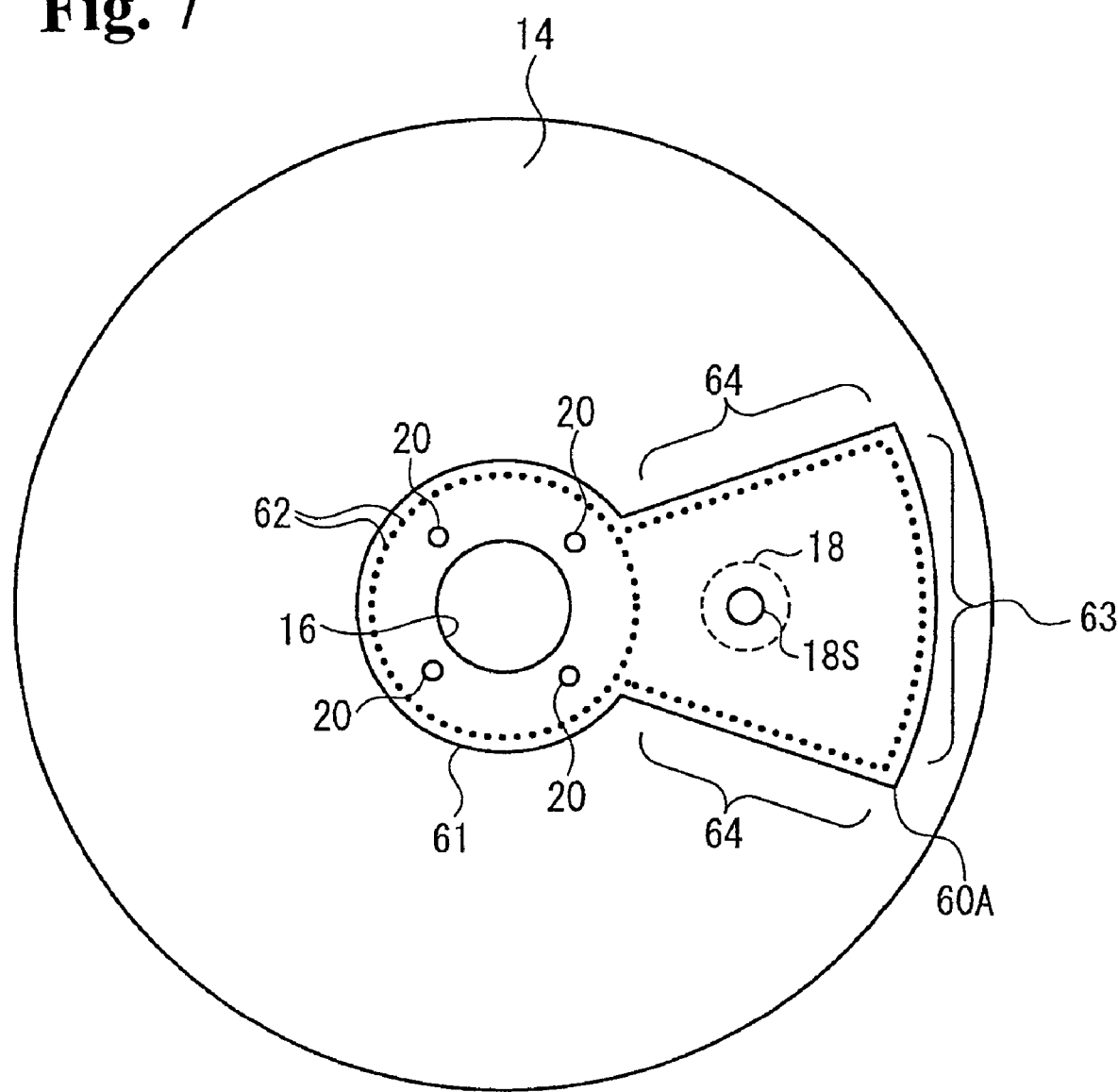
FIG. 7 is a plan view illustrating a rear panel according to a fourth embodiment.

For example, as a lid member 60A of a fourth embodiment of the invention, shown in FIG. 7, an auxiliary venthole 18S formed of an opening having a diameter smaller than that of the venthole 18 may be formed at a portion overlapping with the venthole 18 of the rear panel 14. The inner part of the airbag 10 is allowed to constantly communicate with outside of the airbag 10 via the auxiliary venthole 18S and the venthole 18. Other aspects of the configuration of the airbag, shown in FIG. 7, are identical to the embodiment described above.

When the occupant hits the airbag 10 at an initial stage of the expansion of the airbag 10, the gas in the inner part of the airbag 10 is discharged via the auxiliary venthole 18S, and the shock applied to the occupant of the motor vehicle is absorbed. When the airbag is expanded more than the predetermined amount, similar to the above-described embodiment, the lid member 60A is torn off by being stretched via the tether 70 and the venthole 18 is opened.

When the venthole 18 is not provided in plural number, the lid member 60 may be provided at all of the ventholes 18 and a venthole 18 having no lid member 60 may also exist.

Figure 8:
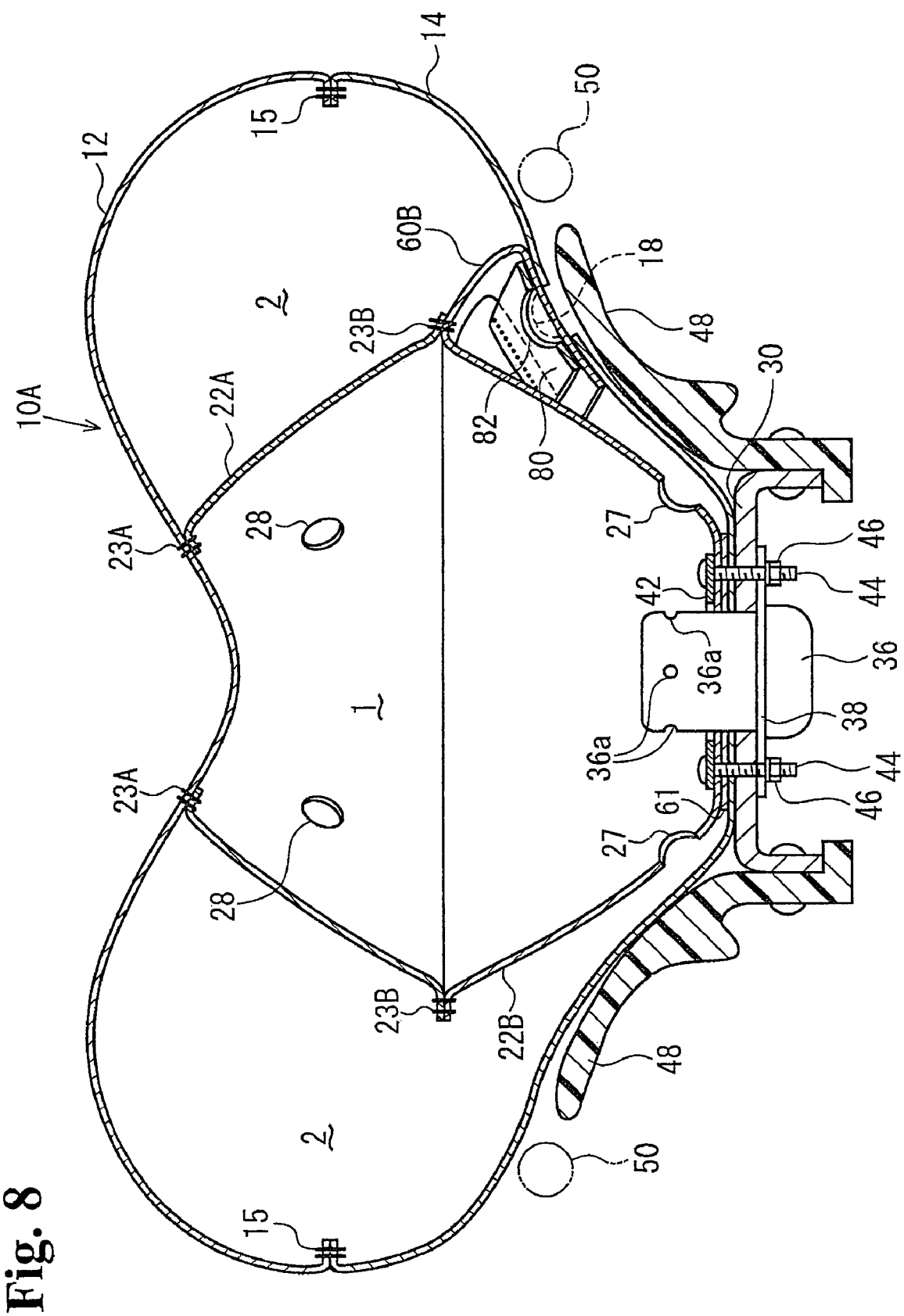
FIG. 8 is a cross-section illustrating an airbag and an airbag apparatus according to a fifth embodiment when the airbag is in the middle of an expansion.
Figure 9:
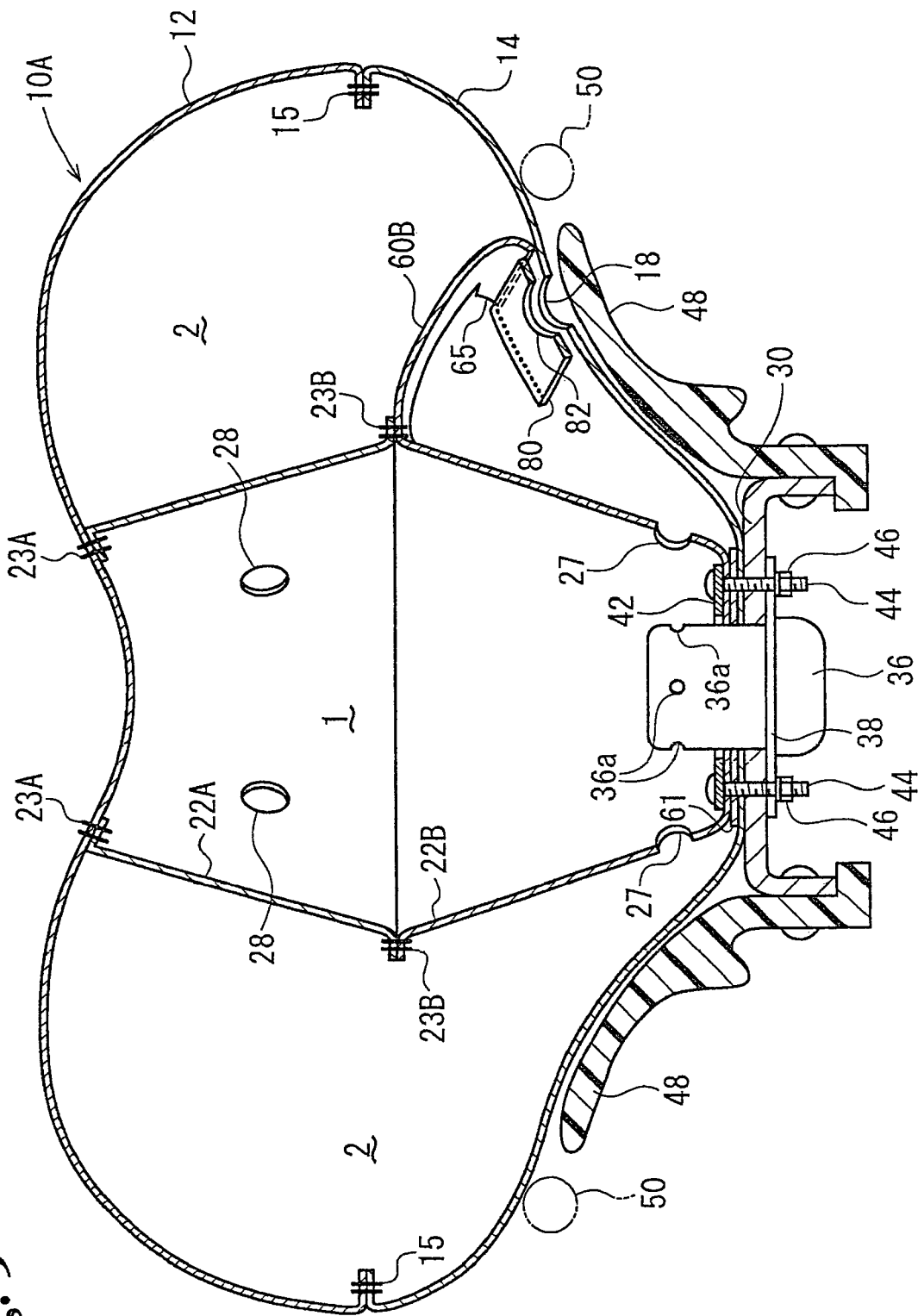
FIG. 9 is a cross-section illustrating the airbag and the airbag apparatus of FIG. 8 on completion of the expansion.
Figure 10:
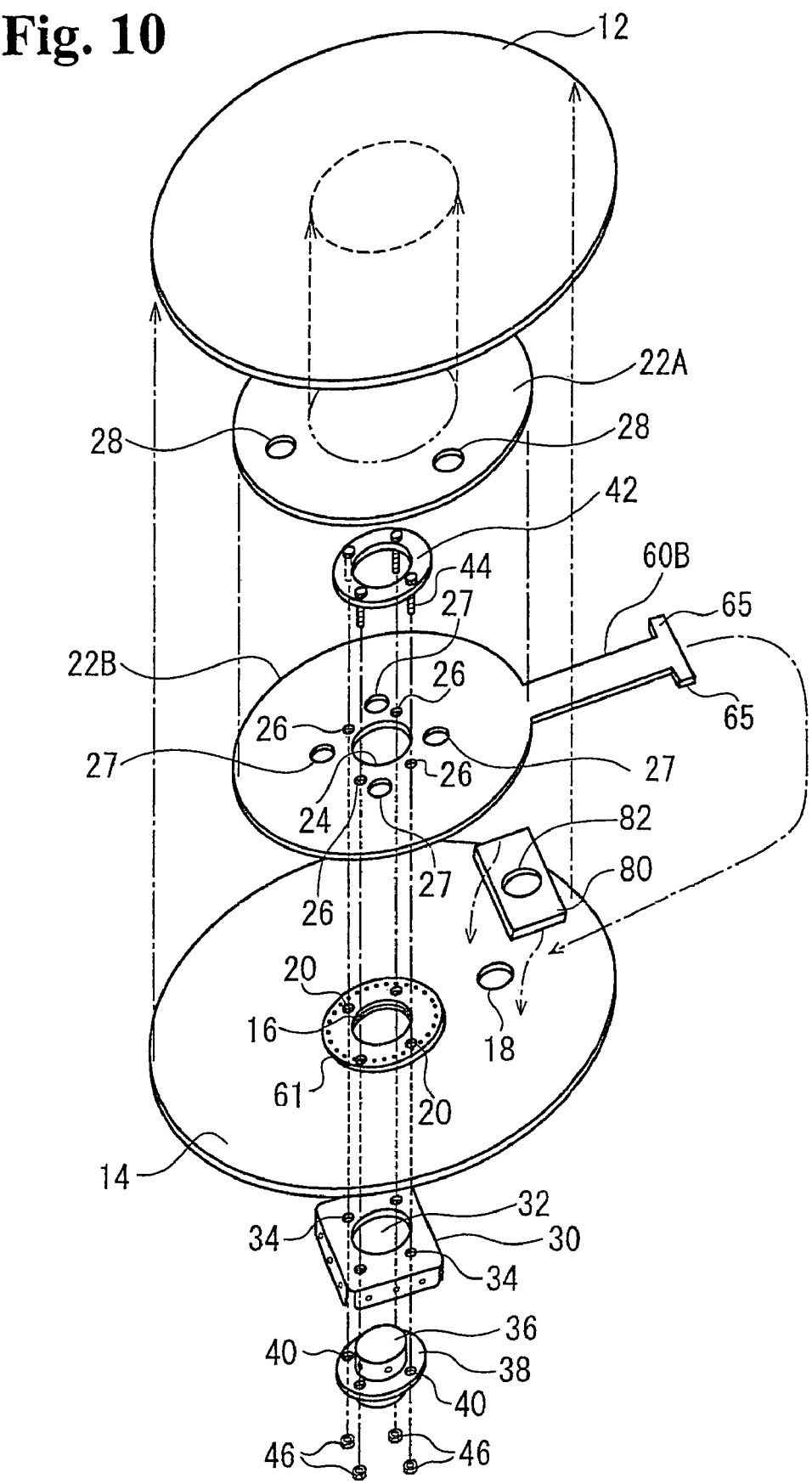
FIG. 10 is an exploded perspective view illustrating the airbag and the airbag apparatus of FIG. 9.
Figure 11:
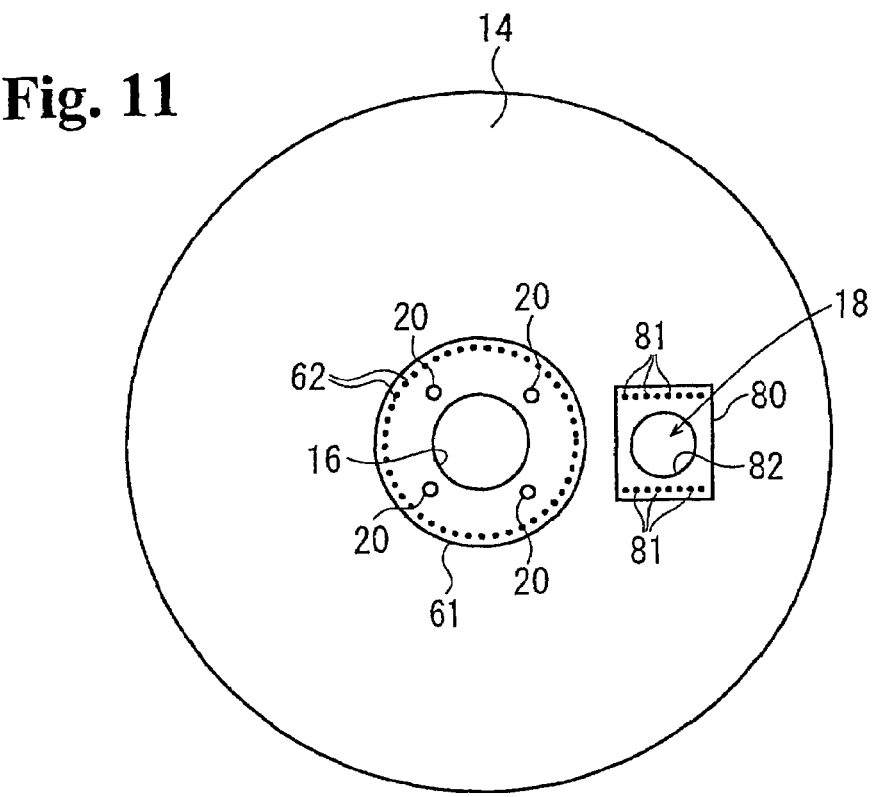
FIG. 11 is a plan view illustrating a rear panel of the airbag in FIG. 9.
Figure 12:
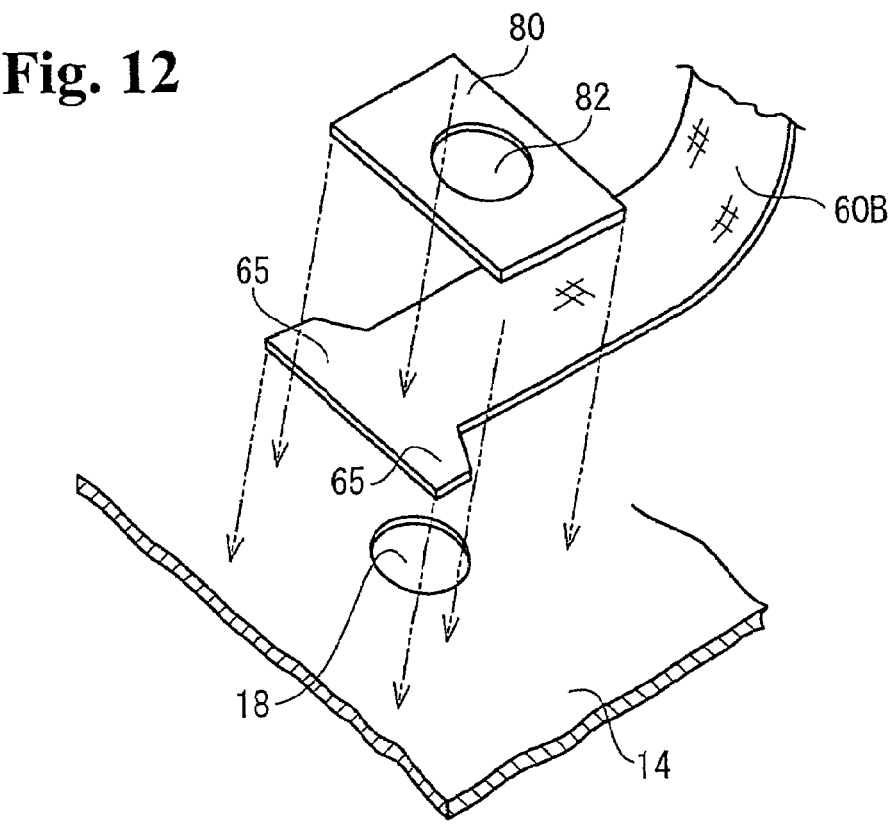
FIG. 12 is an exploded perspective view of a part of the airbag close to the venthole in FIG. 8.

FIGS. 8 and 9 are cross-sections illustrating the airbag 10A and the airbag apparatus with respect to a fifth embodiment of the invention in the middle of an expansion of the airbag 10A and on completion of the expansion of the airbag 10A, respectively. FIG. 10 is an exploded perspective view illustrating the airbag 10A and the airbag apparatus; FIG. 11 is a plan view illustrating the rear panel 14 of the airbag 10A; FIG. 12 is an exploded perspective view illustrating part of the airbag 10A close to the venthole 18; and FIGS. 13(*a*) and 13(*b*) are perspective views illustrating the part of the airbag 10A close to the venthole 18 in each of the cases when the venthole 18 is closed, and when the venthole 18 is opened, respectively.

The airbag 10A for use in a driver-side seat of this embodiment is also provided with the front panel 12 that constitutes a face facing the occupant, the rear panel 14 that constitutes an outer face on an opposite side of the face facing the occupant, the first and second inner panels 22A and 22B for partitioning the inner part of the airbag 10A into the first chamber 1 and the second chamber 2, the venthole 18 serving as a gas-discharging device for discharging the gas from the second chamber 2 toward outside of the airbag 10A, and a lid member 60B serving as a limiting device for limiting gas-discharging operation performed by the venthole 18.

The disposition, the mutual combining structure, and the like, of the front panel 12, the rear panel 14, the first inner panel 22A, and the second inner panel 22B are identical to those of the airbag 10 in the above-described embodiment in FIGS. 1 through 4, and the explanation will be omitted.

In this fifth embodiment, the venthole 18 is also disposed between a peripheral edge portion (the patch cloth 61 attached to the peripheral edge portion) of the opening for inflator 16 at the center of the rear panel 14 and the outer periphery (the seam 15 that stitches each of the outer peripheral edge portions of the rear panel 14 and the front panel 12) of the rear panel 14.

In this embodiment, the lid member 60B has a belt-like shape extending from an outer periphery of the second inner panel 22B in a radial direction. The lid member 60B is disposed in a manner so as to be tacked across the second inner panel 22B and the rear panel 14, and the tip end of the lid member 60B covers the venthole 18. In this embodiment, the tip end side of the lid member 60B is not combined with the rear panel 14.

A guide 80 is provided so that the tip end side of the lid member 60B is not misaligned from the venthole 18. In this embodiment, the guide 80 is made of cloth, resin sheet or the like and disposed to be overlapped with the tip end side of the lid member 60B. Further, both ends of the guide 80 in a direction perpendicular to the extending direction of the lid member 60B are respectively stitched on the rear panel 14 (at a part of the rear panel 14 adjacent to the venthole 18). Numerals 81 and 81 denote a stitched seam for the guide 80. The tip end side of the lid member 60B is slidably inserted between the guide 80 and the rear panel 14.

On the other hand, in the guide 80, an opening 82 having a size and a shape, both of which are approximately the same as those of the venthole 18, is provided.

In this embodiment, an overhanging portion 65 that overhangs from the tip end side of the lid member 60B in a direction perpendicular to the extending direction thereof is provided. Resulting from providing the overhanging portion 65, the lid member 60B is configured not to be pulled out from the guide 80 unless the lid member 60B is stretched by strong force.

Other aspects of the configuration of this embodiment are identical to those in the embodiment shown in FIGS. 1 through 4, and a same reference number in FIGS. 8 through 13(*a*) and 13(*b*) denotes the same element in FIGS. 1 through 4.

In the airbag 10A, the venthole 18 is also closed by the lid member 60B at an initial stage of the expansion of the airbag 10A and because the gas is not discharged from the venthole 18, when the inflator 36 is activated to blow out the gas, and the gas is started to be supplied to the airbag 10A, the inner part of the airbag 10A is promptly brought to be in high internal pressure and the airbag 10A is promptly expanded and deployed.

Figure 13A:
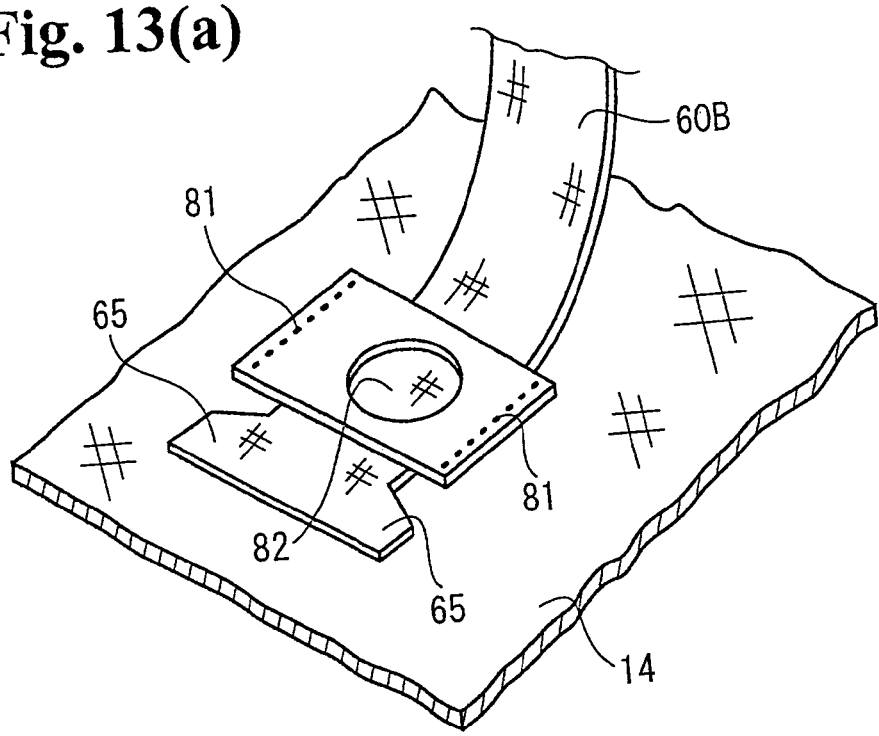
FIGS. 13(a) and 13(b) are perspective views of the part of the airbag close to the venthole in FIG. 8.
Figure 13B:
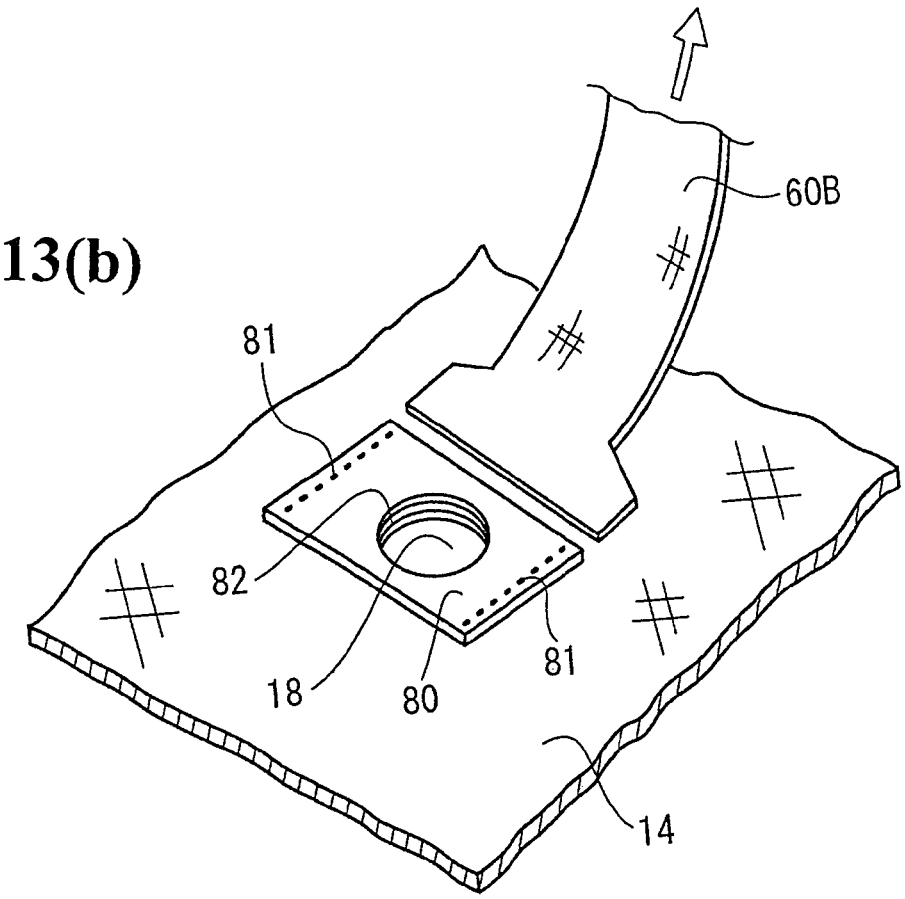

When the airbag 10A is expanded more than the predetermined amount, the lid member 60B is stretched by the second inner panel 22B and pulled out from a place between the guide 80 and the rear panel 14, and the venthole 18 is opened as shown in FIGS. 8, 9, and 13(*a*) and 13(*b*).

In this embodiment, one venthole 18 is provided, however, more than one ventholes 18 may be provided. In this case, the lid member 60B may be provided for all of the ventholes 18. In another embodiment, a venthole 18 without lid member 60B may exist.

The guide 80 for holding a state, in which the lid member 60B covers the venthole 18 until the airbag 10A is expanded more than the predetermined amount, may have a configuration other than that described above. For example, material of the guide 80 may be other than the cloth or resin sheet. The guide 80 may be combined with the rear panel 14 (at a portion of the rear panel 14 adjacent to the venthole 18) by a combining device other than stitching. The size and the shape of the opening 82 formed at a position of the guide 80 overlapping with the venthole 18 may be different from those of the venthole 18. In this embodiment, the tip end side of the lid member 60B is not combined with the rear panel 14, however, the lid member 60B may be combined with the rear panel 14 by, for example, adhesive material having low adhesive force, such as a sealing member or the like.

In this embodiment, although the lid member 60B is integrally formed with the second inner panel 22B, the lid member 60B may be formed in a separate body and attached to the second inner panel 22B by stitching or the like. In this case, the lid member 60B may be attached to a portion other than the outer periphery of the second inner panel 22B. The lid member 60B may be provided in the first inner panel 22A.

Figure 14A:
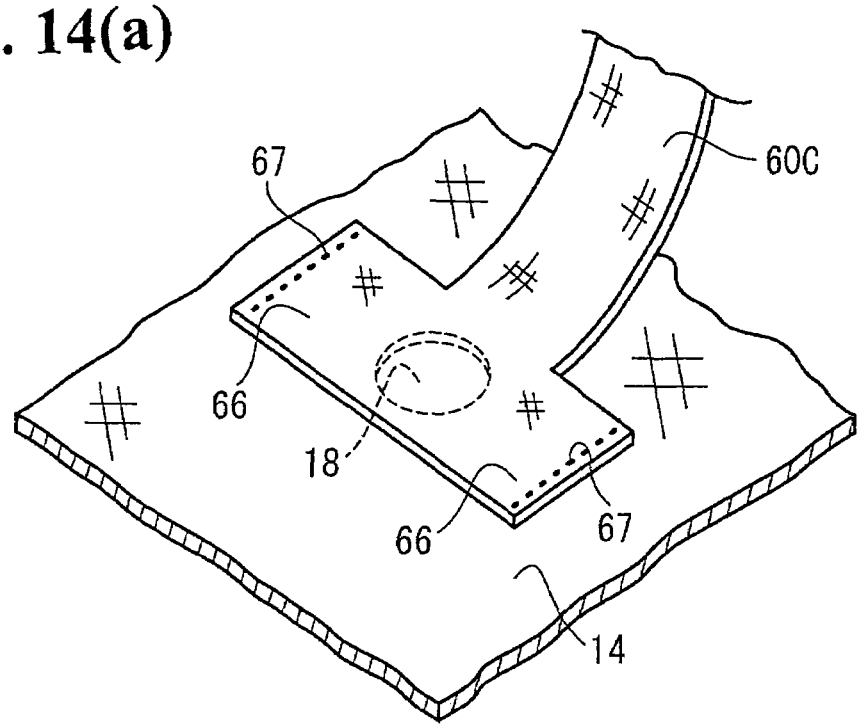
FIGS. 14(a) and 14(b) are perspective views illustrating a part of the airbag close to the venthole according to a sixth embodiment.
Figure 14:
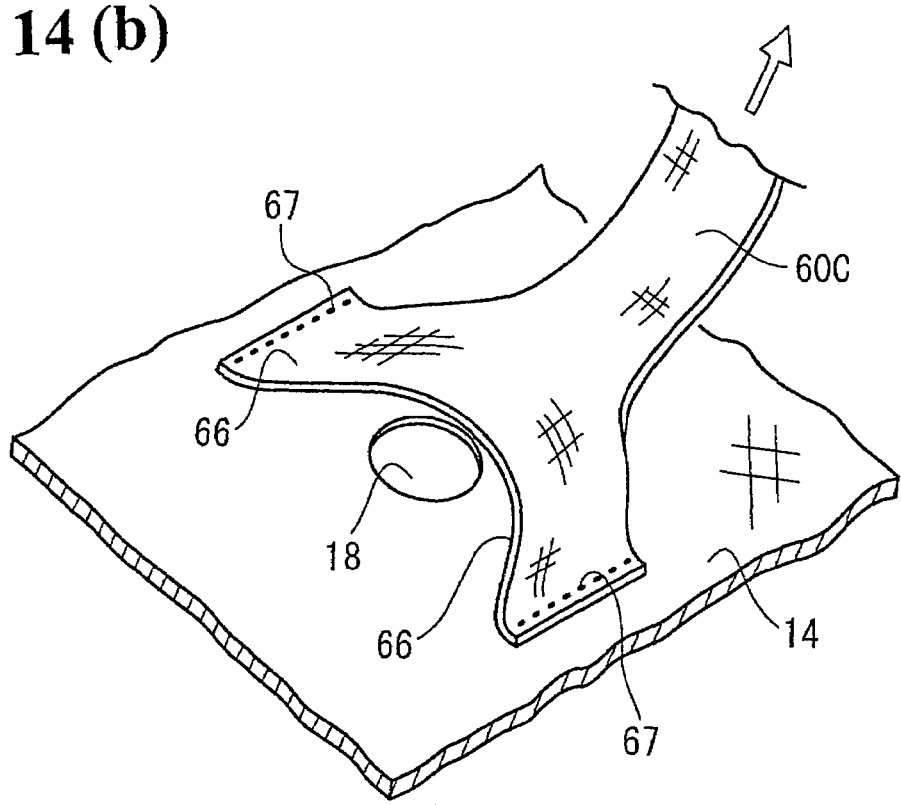

FIGS. 14(*a*) and 14(*b*) are perspective views illustrating the venthole of the airbag according to a sixth embodiment of the invention when the venthole is closed, and when the venthole is opened, respectively.

In this embodiment, the venthole 18 provided in the rear panel 14 is covered with a belt-like shaped lid member 60C. The lid member 60C is, similar to the aforementioned lid member 60B, disposed in a manner so as to be tacked across the rear panel 14 and the first inner panel 22A or the second inner panel 22B. (The first inner panel 22A and the second inner panel 22B are not shown in FIGS. 14(*a*) and 14(*b*); refer to FIGS. 8 and 9). One end side (base end side) of the lid member 60C is connected to the first inner panel 22A or the second inner panel 22B and the other end side of the lid member 60C (tip end side) is overlapped with the venthole 18.

In this embodiment, overhanging portions 66 and 66 that overhang from a tip end side of the lid member 60C at both sides in a direction perpendicular to the extending direction of the lid member 60C are provided. Each of tip end sides of the overhanging portion 66 and 66 in the overhanging directions thereof is combined with the rear panel 14 (at a part of the rear panel 14 adjacent to the venthole 18) respectively, by stitching process or the like. Reference number 67 denotes the stitched seam.

Other aspects of the configuration of this embodiment are identical to those shown in FIGS. 8 through 13(*a*) and 13(*b*).

In this embodiment, until the airbag 10A is expanded more than the predetermined amount, the tip end side of the lid member 60C covers the venthole 18, as illustrated in FIG. 14(*a*). Further, when the airbag 10A is expanded more than the predetermined amount, because the lid member 60C is stretched by the first inner panel 22A and the second inner panel 22B, the tip end side of the lid member 60C retreats from the venthole 18 and the venthole 18 is thereby brought to be in an open state, as illustrated in FIG. 14(*b*).

Figure 15A:
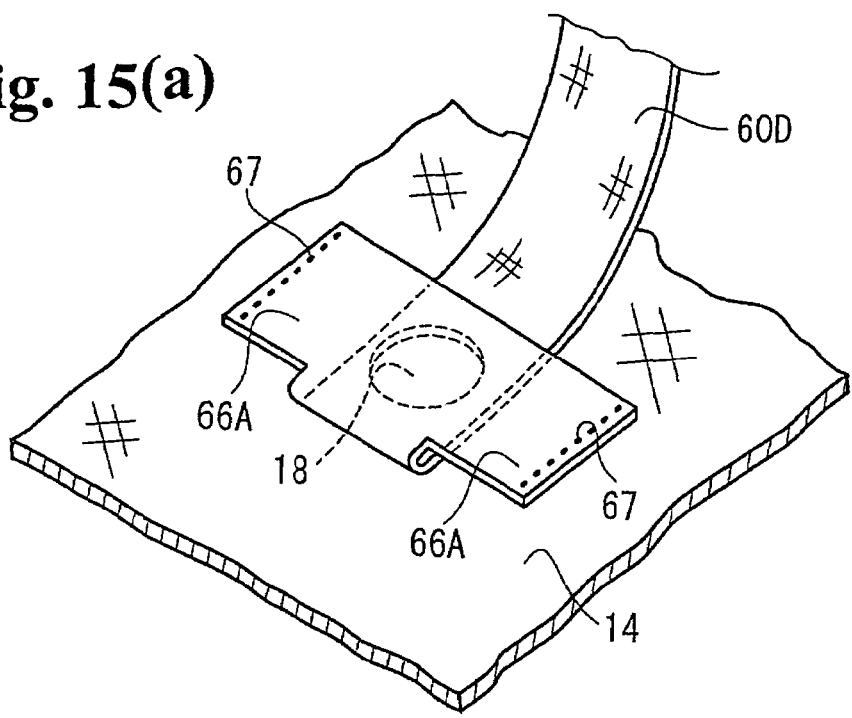
FIGS. 15(a) and 15(b) are perspective views illustrating a part of an airbag close to the venthole with respect to a seventh embodiment.
Figure 15B:
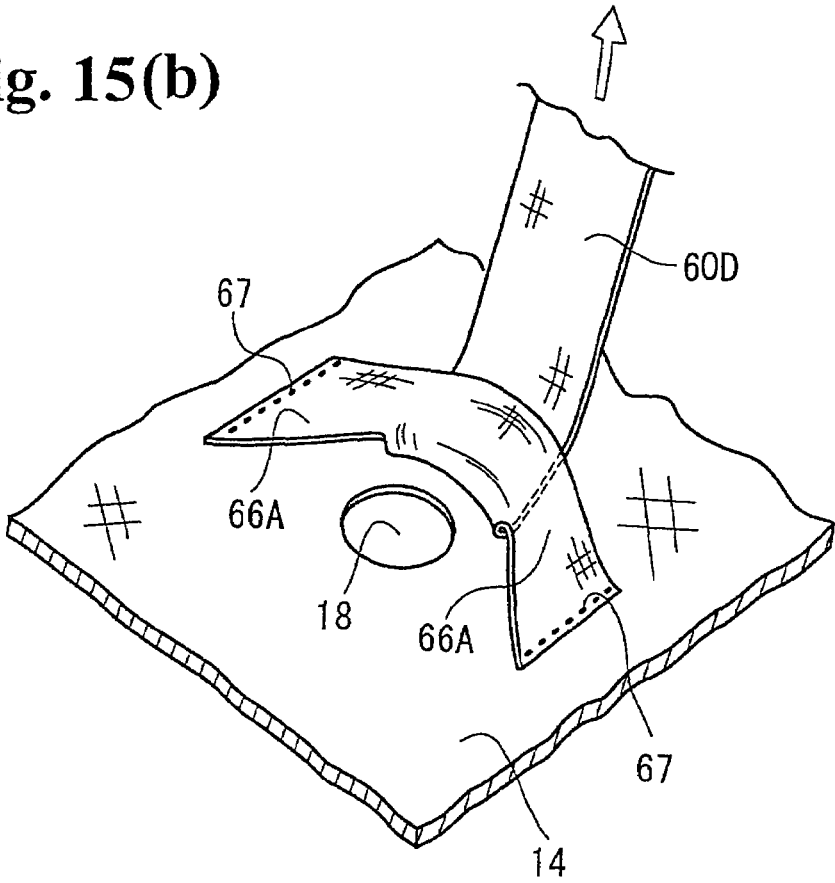

FIGS. 15(*a*) and 15(*b*) are perspective views illustrating the open state of the venthole and the closed state thereof at the part of the airbag close to the venthole, according to a seventh embodiment of the invention, respectively.

In this embodiment, the venthole 18 formed in the rear panel 14 is covered with a belt-like shaped lid member 60D. The lid member 60D is also disposed in a manner so as to be tacked across the rear panel 14 and the first inner panel 22A or the second inner panel 22B (not shown), and the one end side (base end side) of the lid member 60D is connected to the first inner panel 22A or the second inner panel 22B. Further, the other end side (tip end side) of the lid member 60D is overlapped with the venthole 18.

At the tip end side of the lid member 60D, overhanging portions 66A and 66A that overhang at both sides in a direction perpendicular to the extending direction of the lid member 60D are also provided. In this embodiment, the tip end side of the lid member 60D (including the overhanging portions 66A and 66A) is overlapped with the venthole 18 in a state of being folded back toward the base end side thereof, and each of the overhanging portions 66A and 66A is stitched on the rear panel 14 (at a part of the rear panel 14 adjacent to the venthole 18) by the seam 67.

Other aspects of the configuration of this embodiment are identical to those shown in FIGS. 8 through 13(*a*) and 13(*b*).

In this embodiment, the tip end side of the lid member 60D covers the venthole 18 until the airbag 10A is expanded in the predetermined amount, as shown in FIG. 15(*a*). In addition, when the airbag 10A is expanded more than the predetermined amount, because the lid member 60D is stretched by the first inner panel 22A and the second inner panel 22B, the tip end side of the lid member 60D retreats from the venthole 18 and the venthole 18 is brought to be in the open state, as shown in FIG. 15(*b*).

Figure 16:
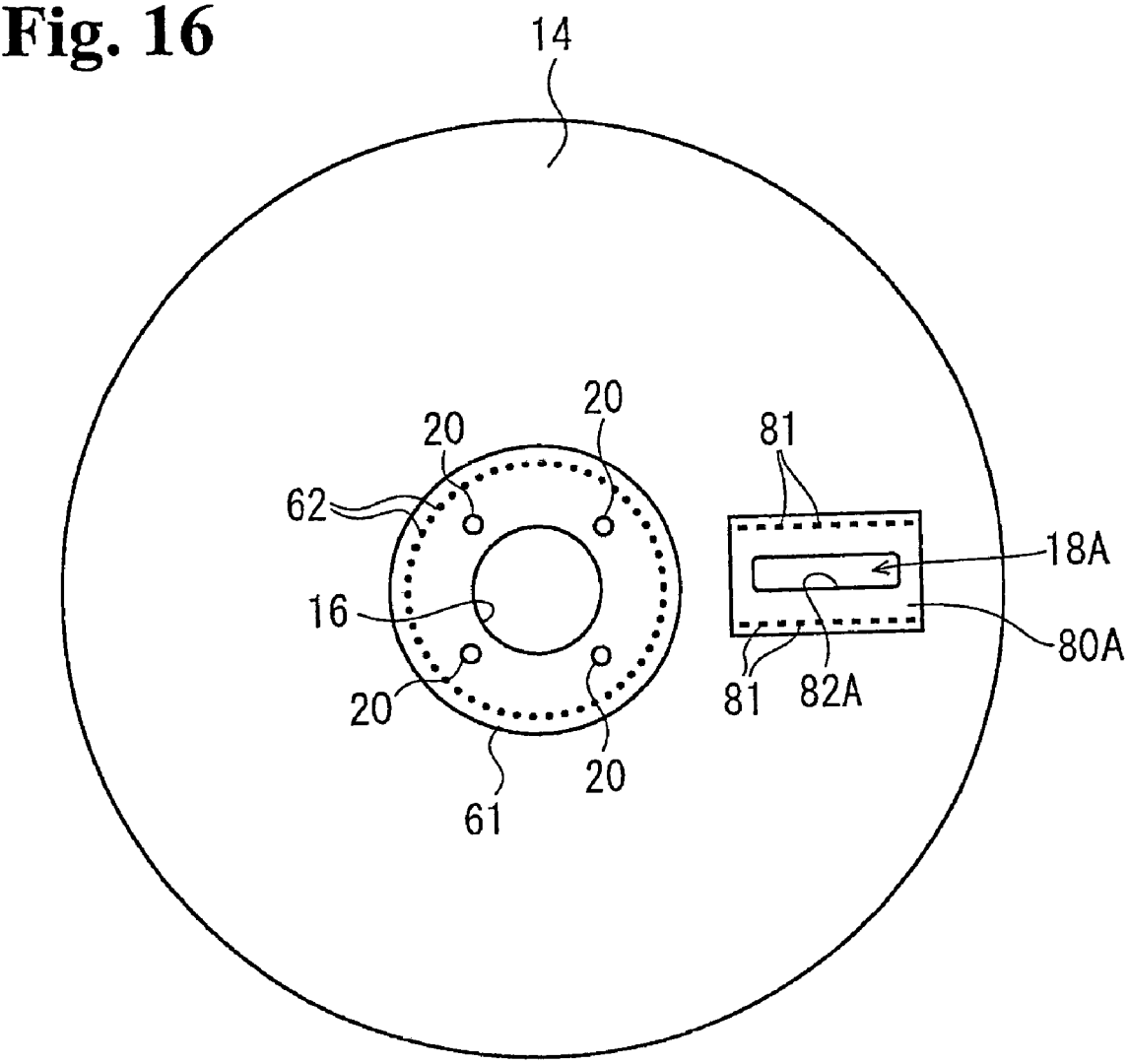
FIG. 16 is a plan view illustrating a rear panel of an airbag with respect to an eighth embodiment.
Figure 17A:
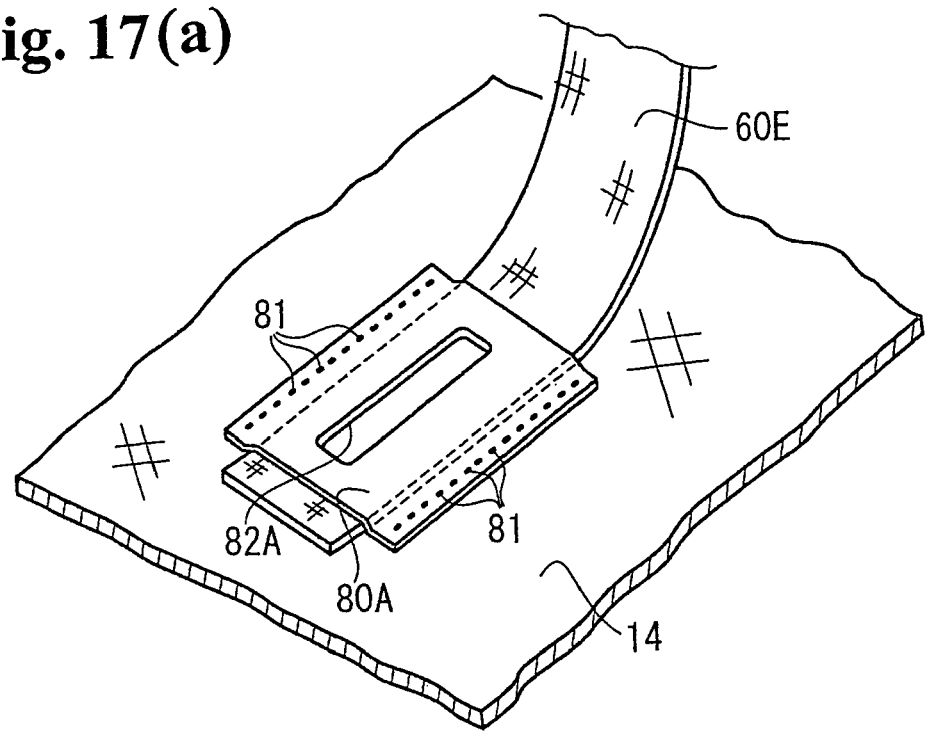
FIGS. 17(a) and 17(b) are perspective views illustrating a part of the airbag close to the venthole of FIG. 16.
Figure 17B:
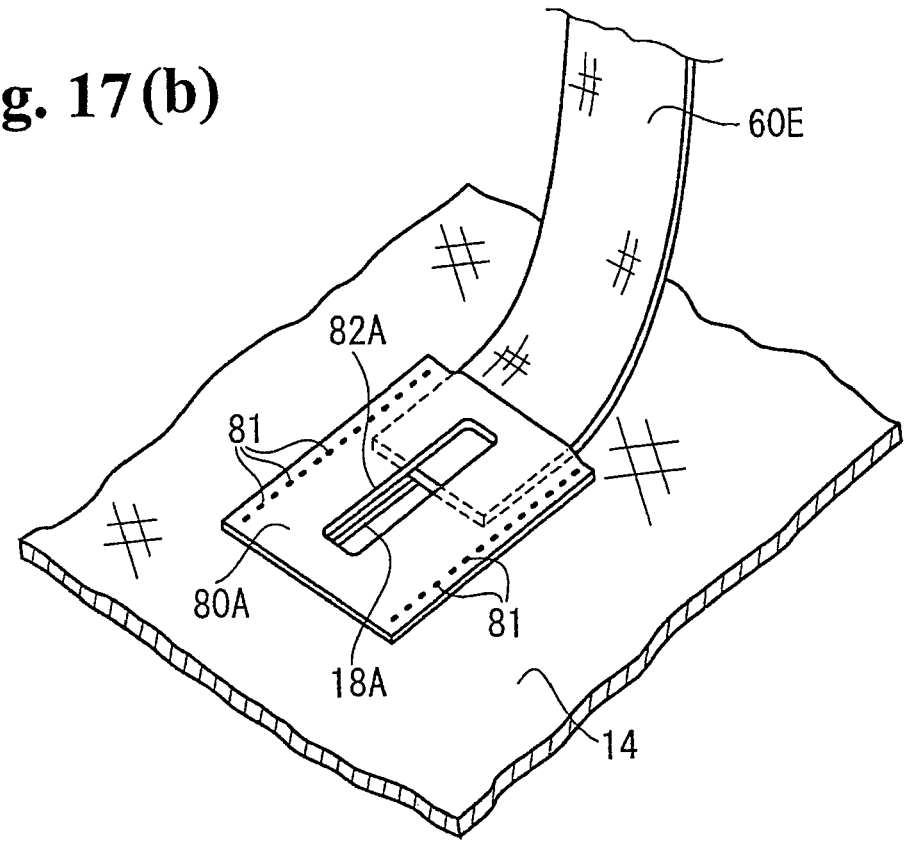

FIG. 16 is a plan view illustrating the rear panel of the airbag according to an eighth embodiment of the invention, and FIG. 17 is a perspective view respectively illustrating the closed state and the open state of the venthole at the part of the airbag close to the venthole.

As illustrated in FIG. 16, in this embodiment, an elongated-hole shaped venthole 18A is formed in the rear panel 14. The venthole 18A is elongated from the center side to the outer periphery side of the rear panel 14, namely, in a radial direction of the rear panel 14.

In this embodiment, the venthole 18A is covered with a belt-like shaped lid member 60E similar to the above-described embodiment. The lid member 60E is disposed in a manner so as to be tacked across the rear panel 14 and the first and second inner panels 22A or 22B (not shown), similar to the lid members 60B through 60D. In addition, one end side (base end side) of the lid member 60E is connected to the first inner panel 22A or the second inner panel 22B and the other end side (tip end side) thereof is overlapped with the venthole 18A. The tip end side of the lid member 60E is disposed to be extending in an extending direction of the venthole 18A. Further, in this embodiment, the tip end of the lid member 60E is not configured to be combined with the rear panel 14.

In this embodiment, a guide 80A is provided so that the tip end side of the lid member 60E is not misaligned from the venthole 18A. The guide 80A is formed from a cloth or a resin sheet, similar to the aforementioned guide 80 (shown in FIGS. 8 through 13(*a*) and 13(*b*)), and is disposed to be overlapped with the tip end side of the lid member 60E. Further, both end sides of the lid member 60E in a direction perpendicular to the extending direction thereof are respectively stitched on the rear panel 14 (at part of the rear panel 14 adjacent to the venthole 18A). Reference numbers 81 and 81 denote the stitched seam. The tip end side of the lid member 60E is slidably inserted into a position between the guide 80A and the rear panel 14 in the extending direction of the venthole 18A.

Further, in this embodiment, an elongated-hole shaped opening 82A having an approximately the same size and the same shape (the same length and width) as those of the venthole 18A is formed at a position in the guide 80A, at which the guide 80A overlaps with the venthole 18A.

Aspects of the configuration other than that in this embodiment are identical to those shown in FIGS. 8 through 13(*a*) and 13(*b*).

In this embodiment, until the airbag 10A is expanded more than the predetermined amount, the lid member 60E entirely covers the venthole 18A, as illustrated in FIG. 17(*a*). In addition, when the airbag 10A is expanded more than the predetermined amount, the lid member 60E is stretched by the first inner panel 22A and the second inner panel 22B and is pulled out from a position between the guide 80A and the rear panel 14. As a result, the venthole 18A is brought to be in the open state.

At this moment, because the venthole 18A is extending lengthwise in a retreating direction of the lid member 60E, as illustrated in FIG. 17, the opening amount (opening area of the venthole) of the venthole 18*a* is gradually increasing along with the movement of the lid member 60E retreating from the venthole 18A due to the expansion of the airbag 10A. Consequently, the opening amount of the venthole 18A, namely an amount of the gas discharged from the venthole 18A can be minutely controlled corresponding to the expanding amount of the airbag 10A.

Figure 18:
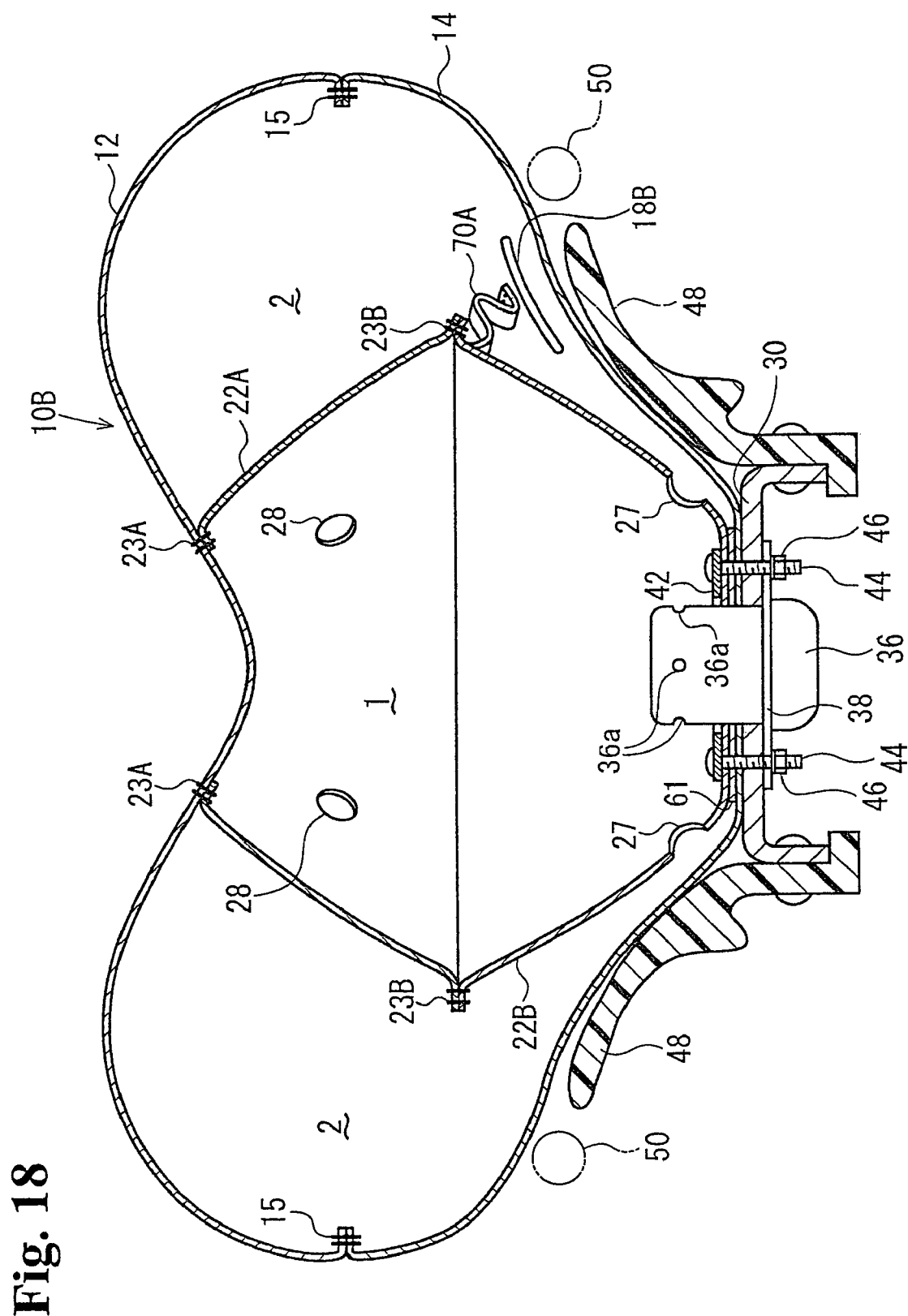
FIG. 18 is a cross-section illustrating an airbag and an airbag apparatus according to a ninth embodiment when the airbag is in the middle of an expansion.
Figure 19:
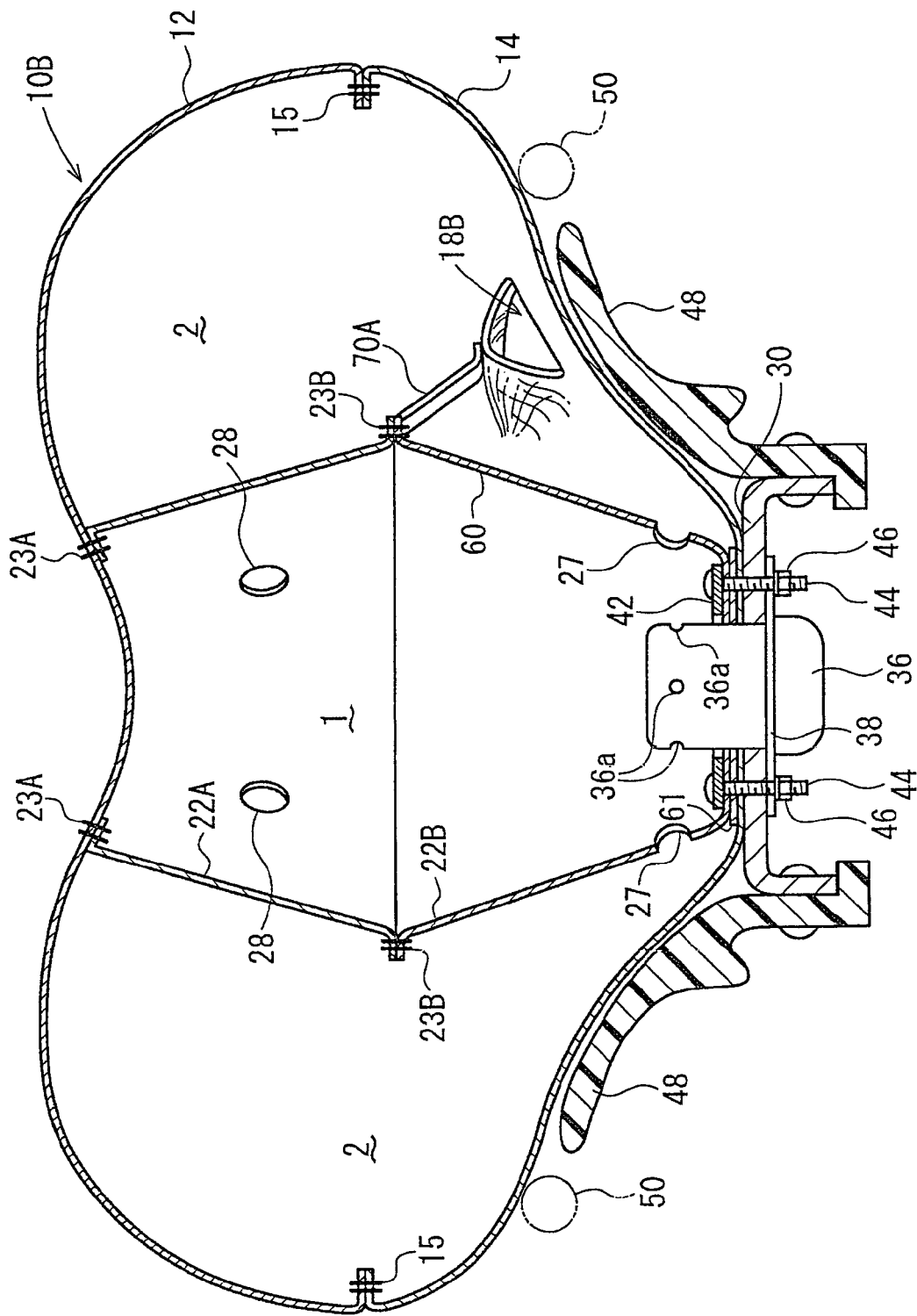
FIG. 19 is a cross-section illustrating the airbag and the airbag apparatus of FIG. 18 on completion of the expansion.
Figure 20:
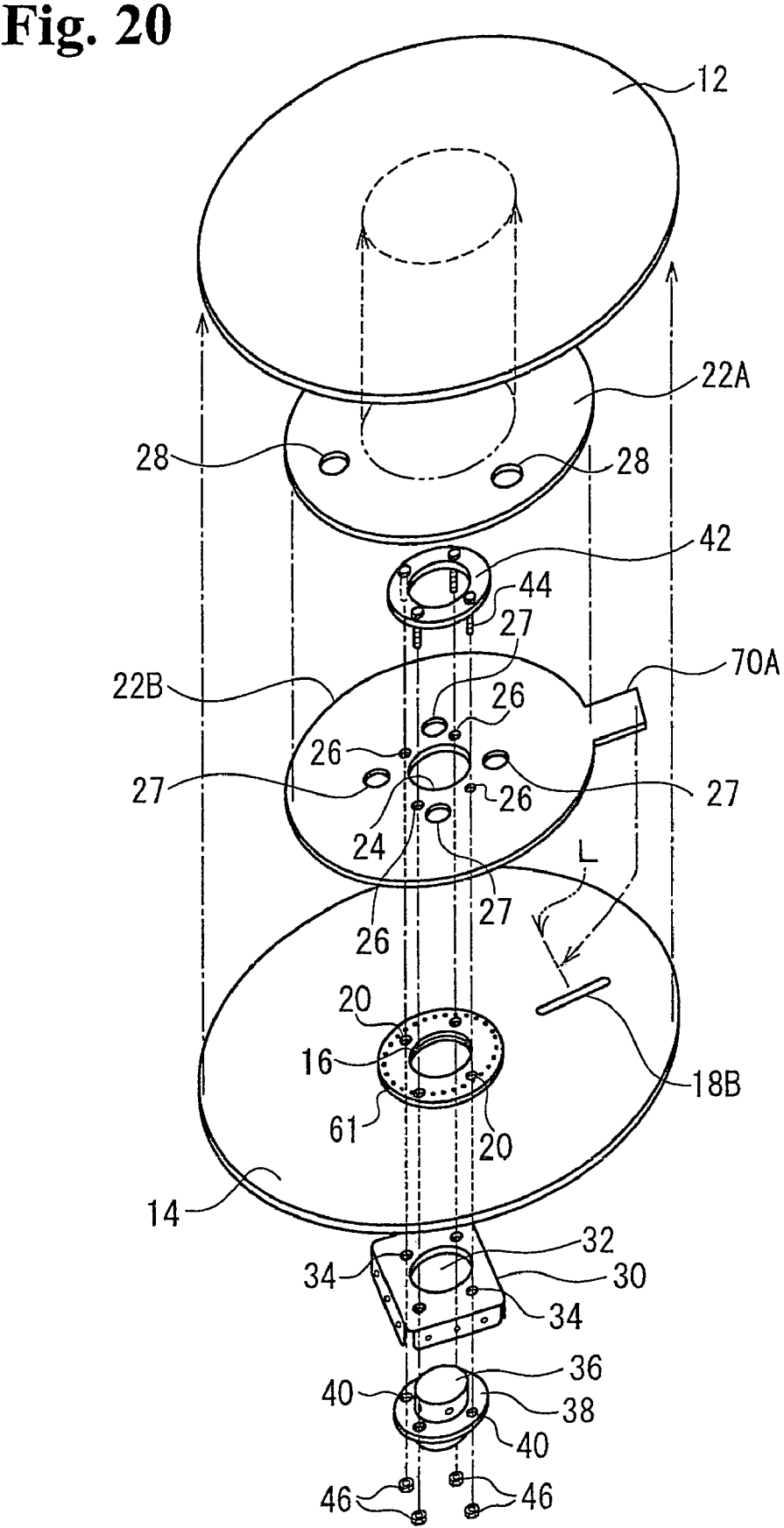
FIG. 20 is a perspective view illustrating the airbag and the airbag apparatus of FIG. 18.

FIGS. 18 and 19 are cross-sections illustrating a state of an airbag and an airbag apparatus according to a ninth embodiment of the invention when the airbag is in the middle of an expansion, and on completion of the expansion, respectively. FIG. 20 is an exploded perspective view illustrating the airbag and the airbag apparatus, and FIG. 21 is a plan view (exploded view) illustrating the rear panel and the second inner panel of the airbag.

An airbag 10B for use in a driver-side seat in this embodiment is also provided with the front panel 12 constituting a face of the airbag 10B facing an occupant, the rear panel 14 constituting an outer face of the airbag 10B opposite to the face facing the occupant, the first and second inner panels 22A and 22B for partitioning an inner part of the airbag 10B into the first chamber 1 and the second chamber 2, a venthole 18B serving as a gas-discharging device for discharging gas toward out side of the airbag 10B from the second chamber 2, and a tether 70A for connecting an edge portion of the venthole 18B to the second inner panel 22B.

The disposition, the mutual combination structure, and the like of the front panel 12, the rear panel 14, the first inner panel 22A, and the second inner panel 22B are identical to those in the airbag 10, illustrated in FIGS. 1 through 4, and the explanation will be omitted. The venthole 18B is also disposed in this embodiment at an area between the peripheral edge portion (the patch cloth 61 attached to the peripheral edge portion) of the opening for inflator 16 at the center of the rear panel 14 and the outer periphery (the seam 15 that stitches each of the outer peripheral edge portions of the rear panel 14 and the front panel 12) of the rear panel 14.

Figure 21:
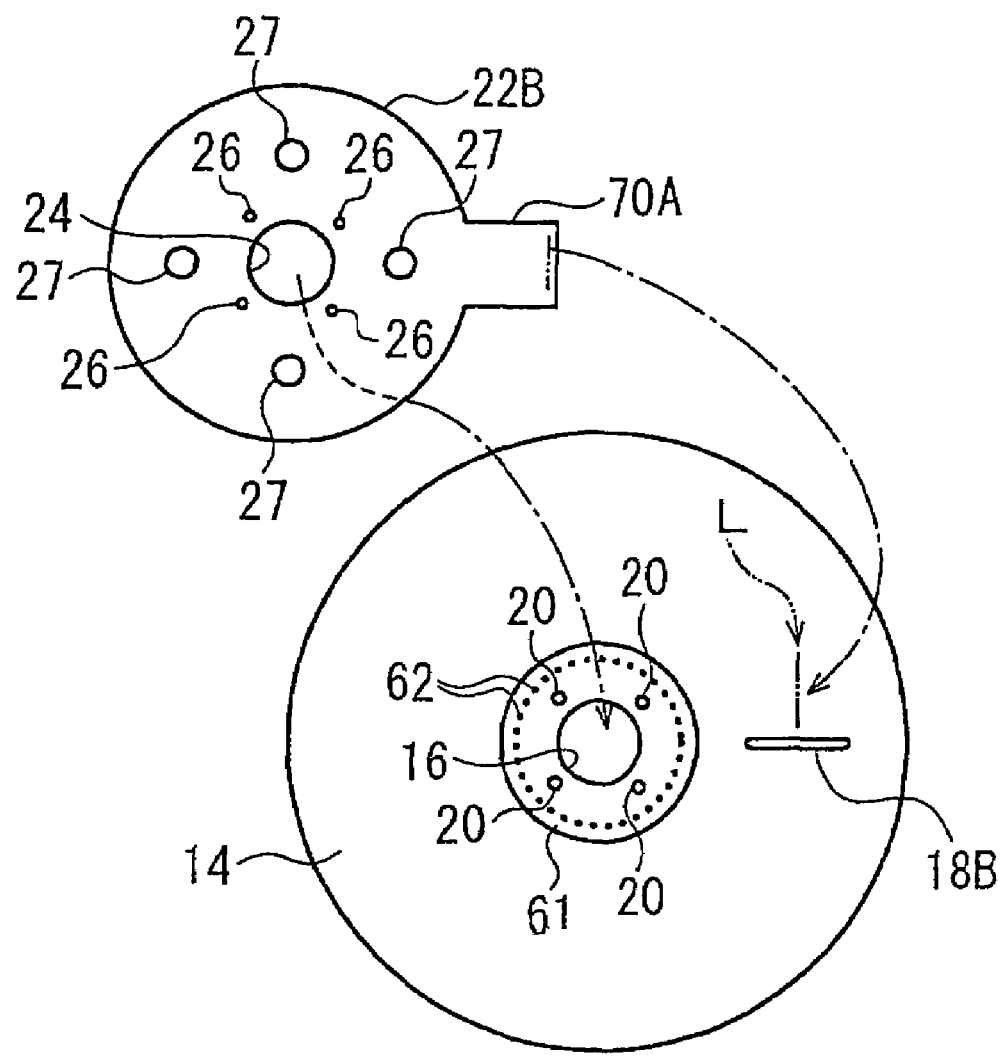
FIG. 21 is a plan view illustrating the rear panel and the second inner panel of the airbag of FIG. 18.

In this embodiment, the venthole 18B has a groove-like shape (slit-like shape) having a pair of longitudinal sides facing each other, as illustrated in FIG. 21. The venthole 18B is formed from a center side of the rear panel 14 toward an outer periphery side thereof, namely, the venthole 18B is formed in a manner so as to be extending in a radial direction of the rear panel 14. In this embodiment, the lid member for covering the venthole 18B is not provided.

The tether 70A is disposed in a manner so as to be tacked across the second inner panel 22B and the rear panel 14 and one end side of the tether 70A is connected to the outer peripheral edge portion of the second inner panel 22B and the other end side of the tether 70A is combined with a middle portion in an extending direction of the longitudinal side of one side of the venthole 18B by stitching or the like. A mark L in FIGS. 20 and 21 denotes the combining line of the other end of the tether 70A.

Aspects of the configuration other than that in this embodiment are identical to those illustrated in FIGS. 1 through 4.

In the airbag 10B, at an initial stage of the expansion thereof, the venthole 18B has the groove-like shape, namely a small opening amount, and because an amount of the gas discharged from the venthole 18B is small, when the inflator is activated and the gas is started to be supplied into the airbag 10B, an inner part of the airbag 10B is promptly brought to be in high inner pressure and thereby, the airbag 10B is promptly expanded and deployed.

When the airbag 10B is expanded more than the predetermined amount, the middle portion of one of the longitudinal sides of the venthole 18B is stretched by the second inner panel 22B via the tether 70A and is separated from the other longitudinal side thereof, as illustrated in FIGS. 18 and 19. As a result, the venthole 18B is brought to have the large opening amount.

Incidentally, in this embodiment, although one venthole 18B is provided, more than one ventholes 18B may be provided.

In this embodiment, although the tether 70A is integrally formed with the second inner panel 22B, the same may be separately formed and attached to the second inner panel 22B by stitching or the like. In this case, the tether 70A may be attached to a portion other than at the outer periphery of the second inner panel 22B. In another embodiment, the tether 70A may be attached to the first inner panel 22A.

Figure 22:
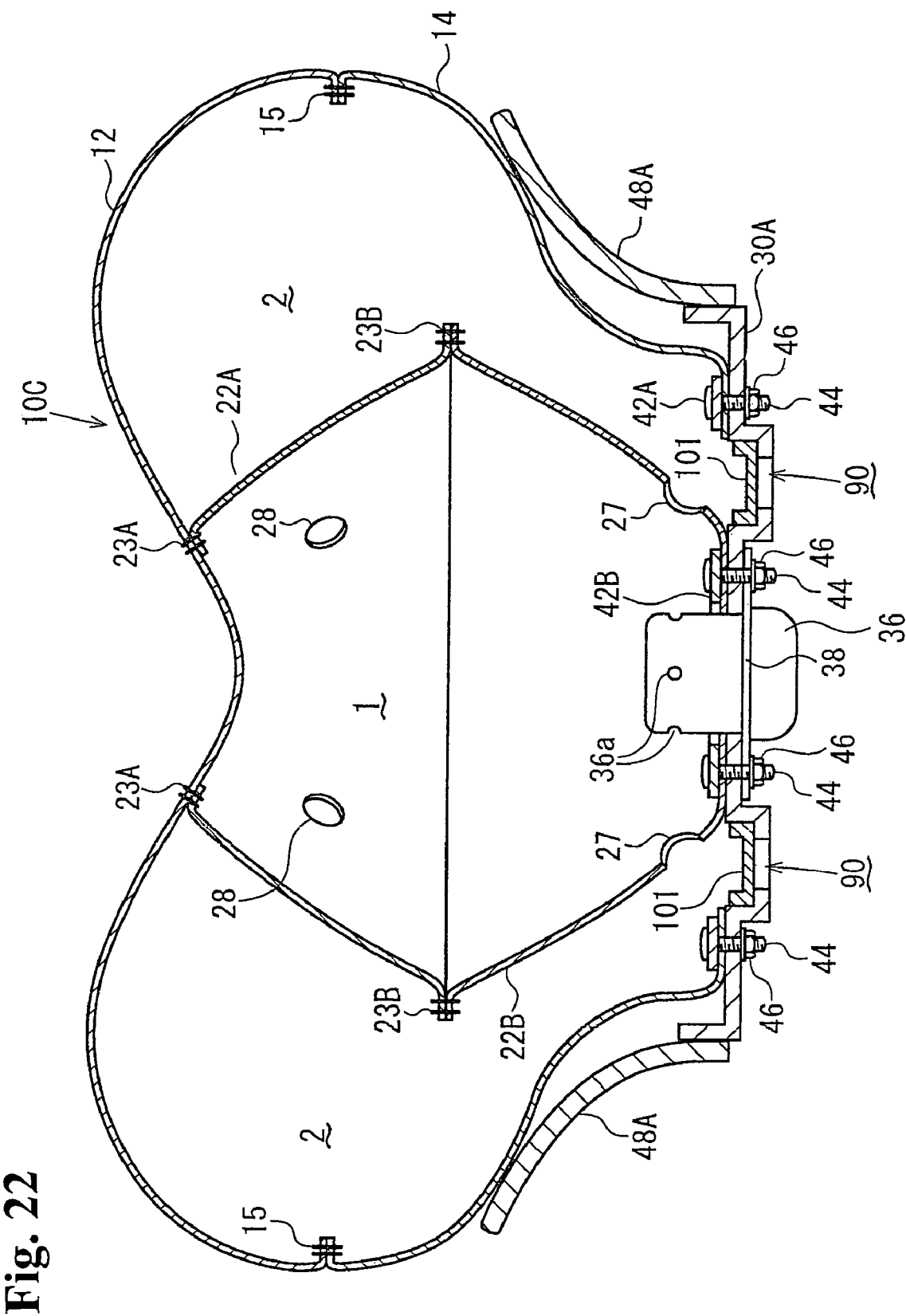
FIG. 22 is a cross-section illustrating an airbag and an airbag apparatus according to a tenth embodiment when the airbag is in the middle of an expansion.
Figure 23:
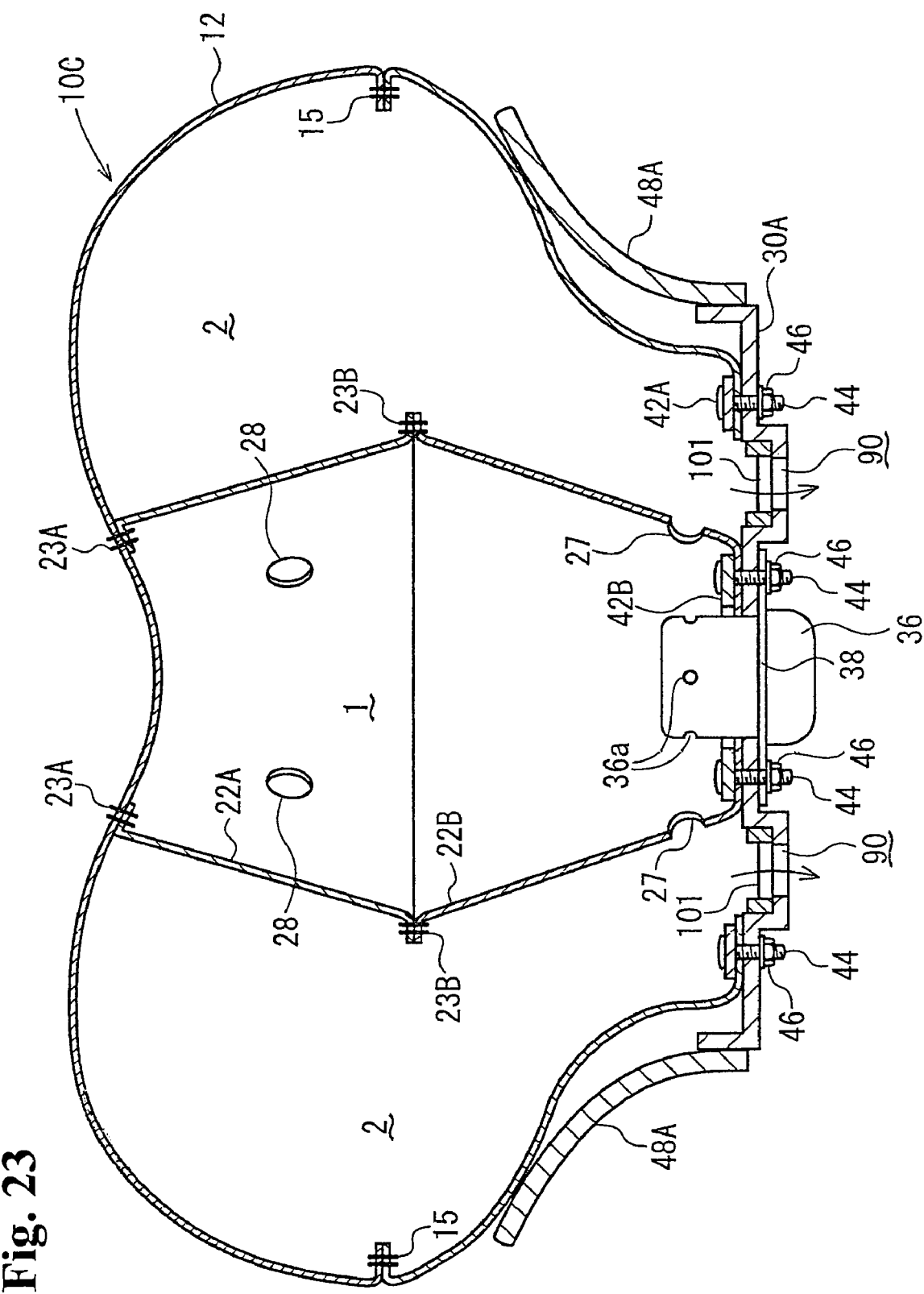
FIG. 23 is a cross-section illustrating the airbag and the airbag apparatus of FIG. 22 on completion of the expansion.
Figure 24:
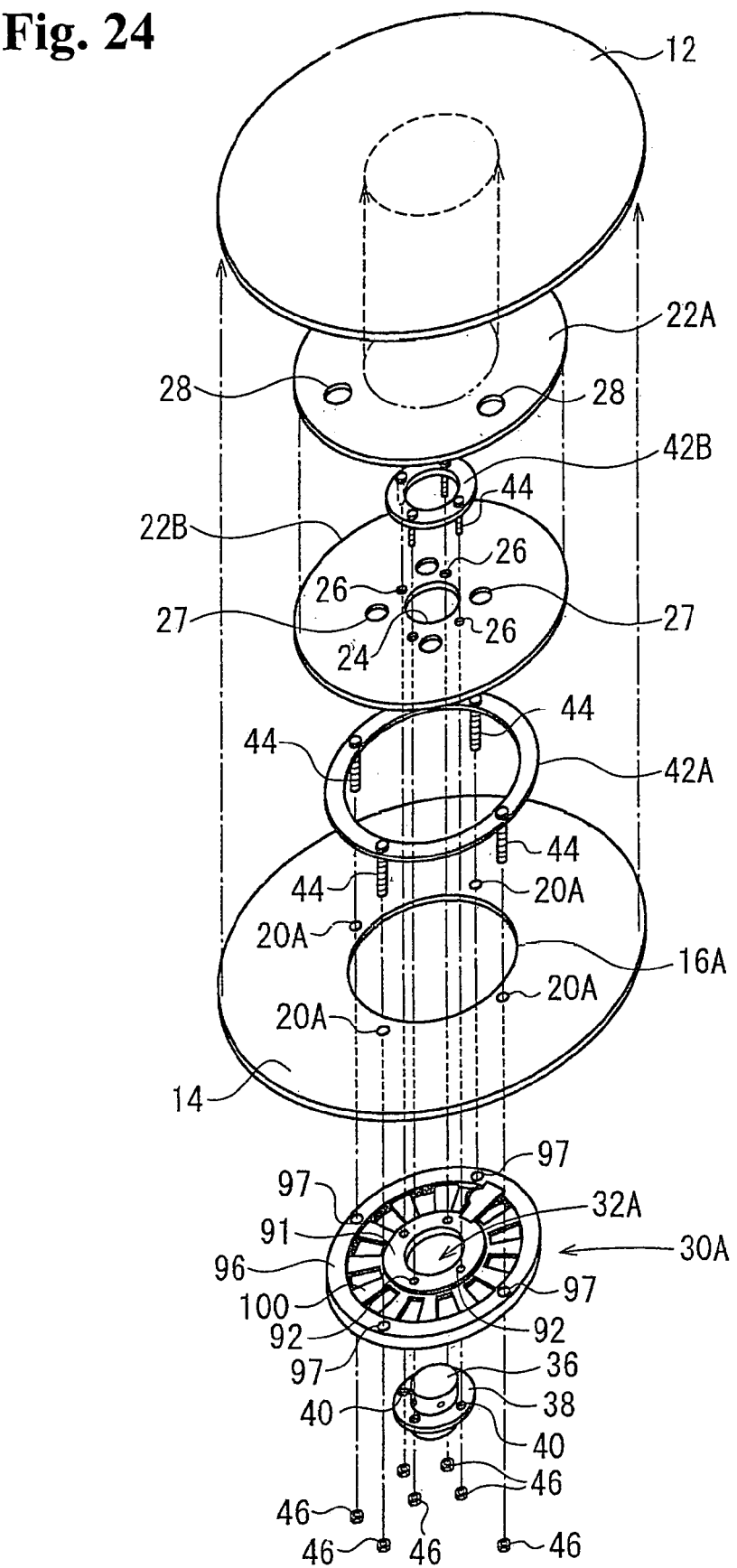
FIG. 24 is an exploded perspective view illustrating the airbag apparatus of FIG. 22.
Figure 25:
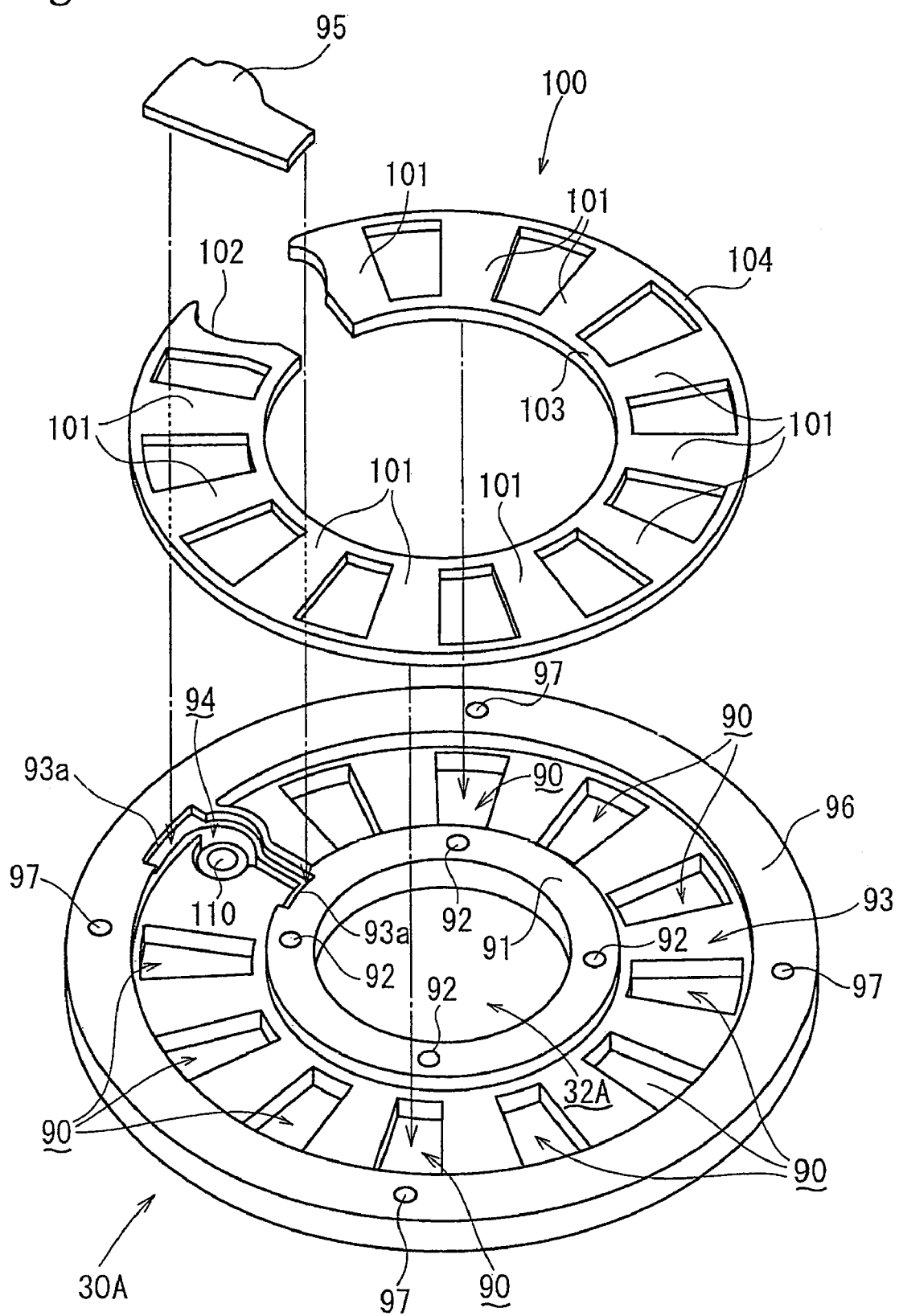
FIG. 25 is an exploded perspective view illustrating a retainer of the airbag apparatus of FIG. 22.
Figure 26:
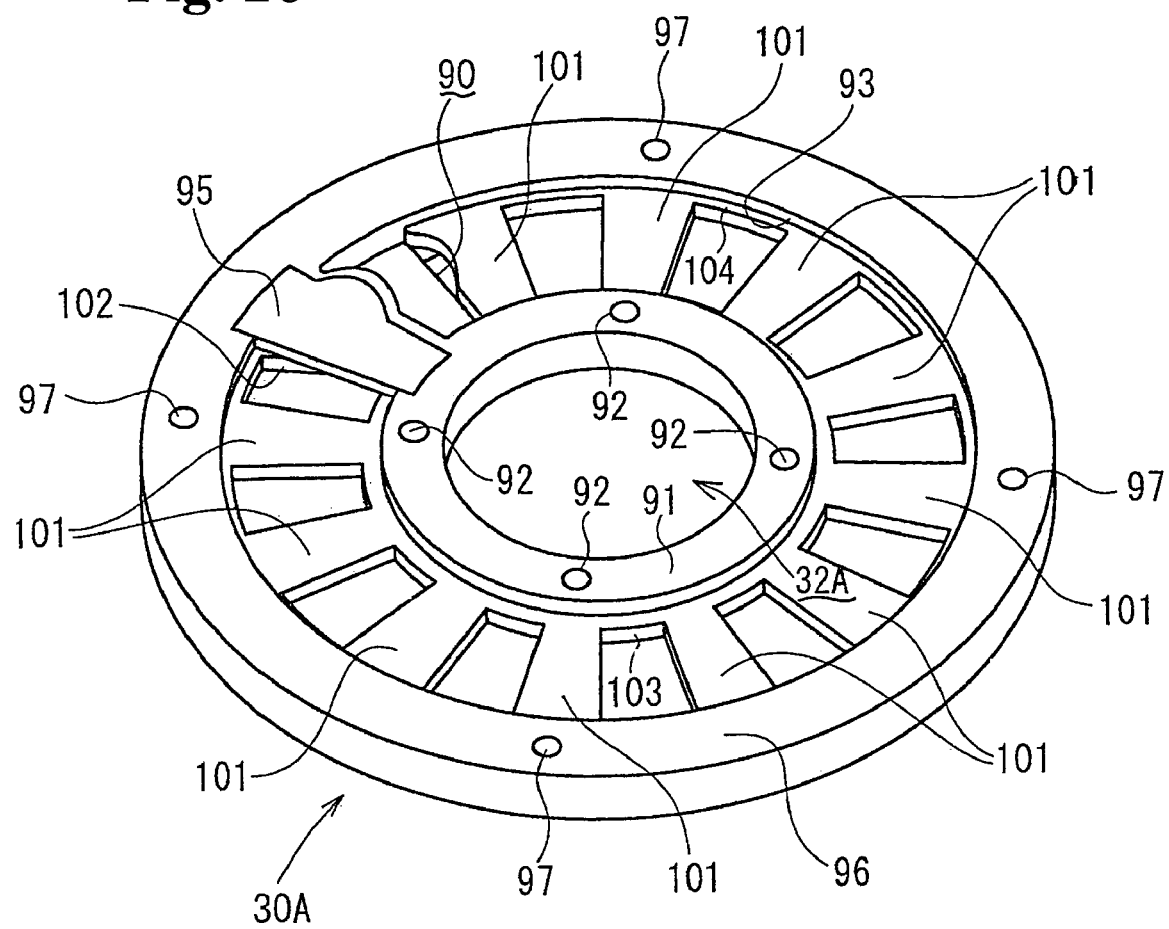
FIG. 26 is a perspective view illustrating the retainer of the airbag apparatus of FIG. 22.
Figure 27:
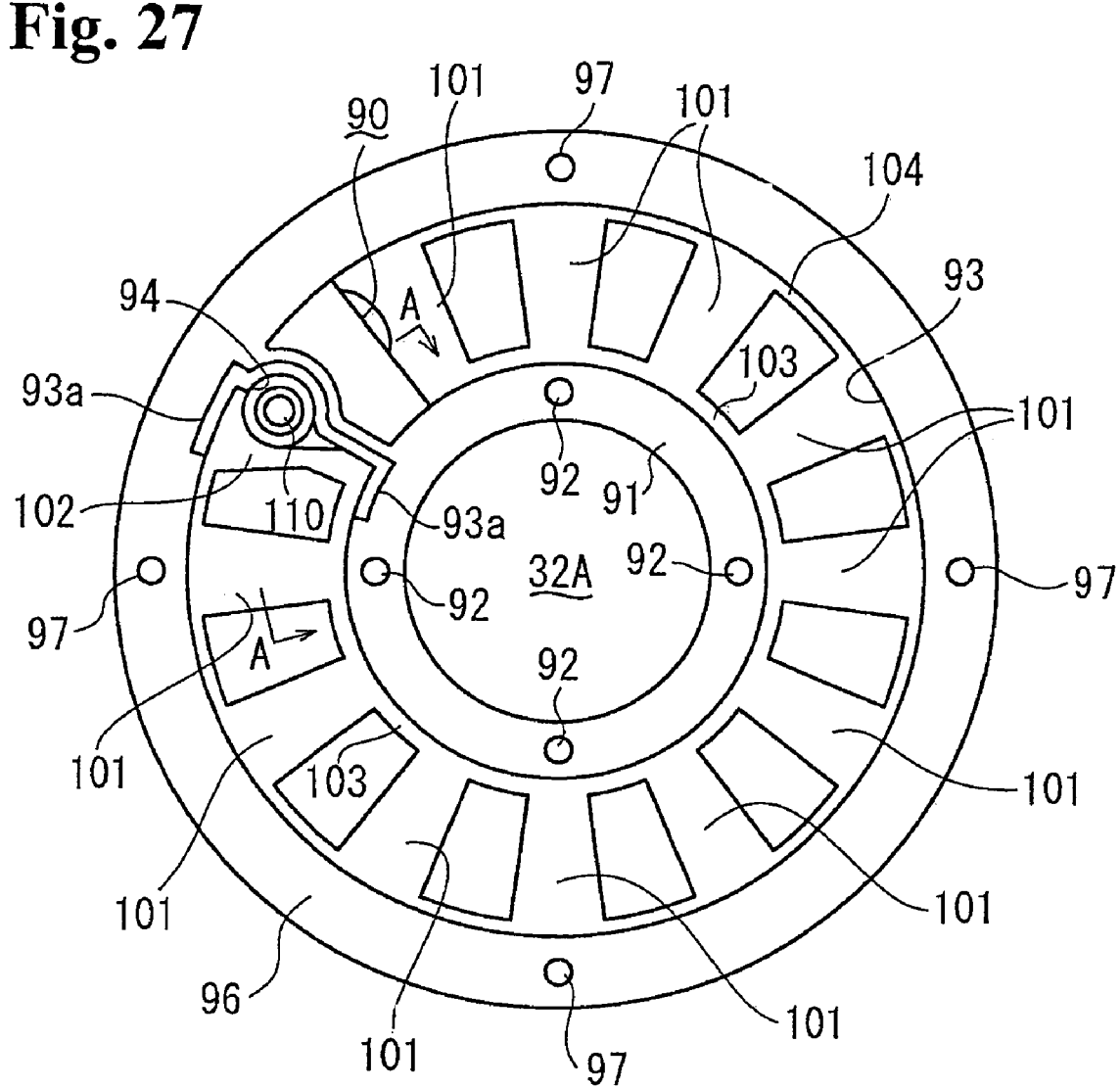
FIG. 27 is a plan view of the retainer illustrating operation of the airbag apparatus of FIG. 22.
Figure 28:
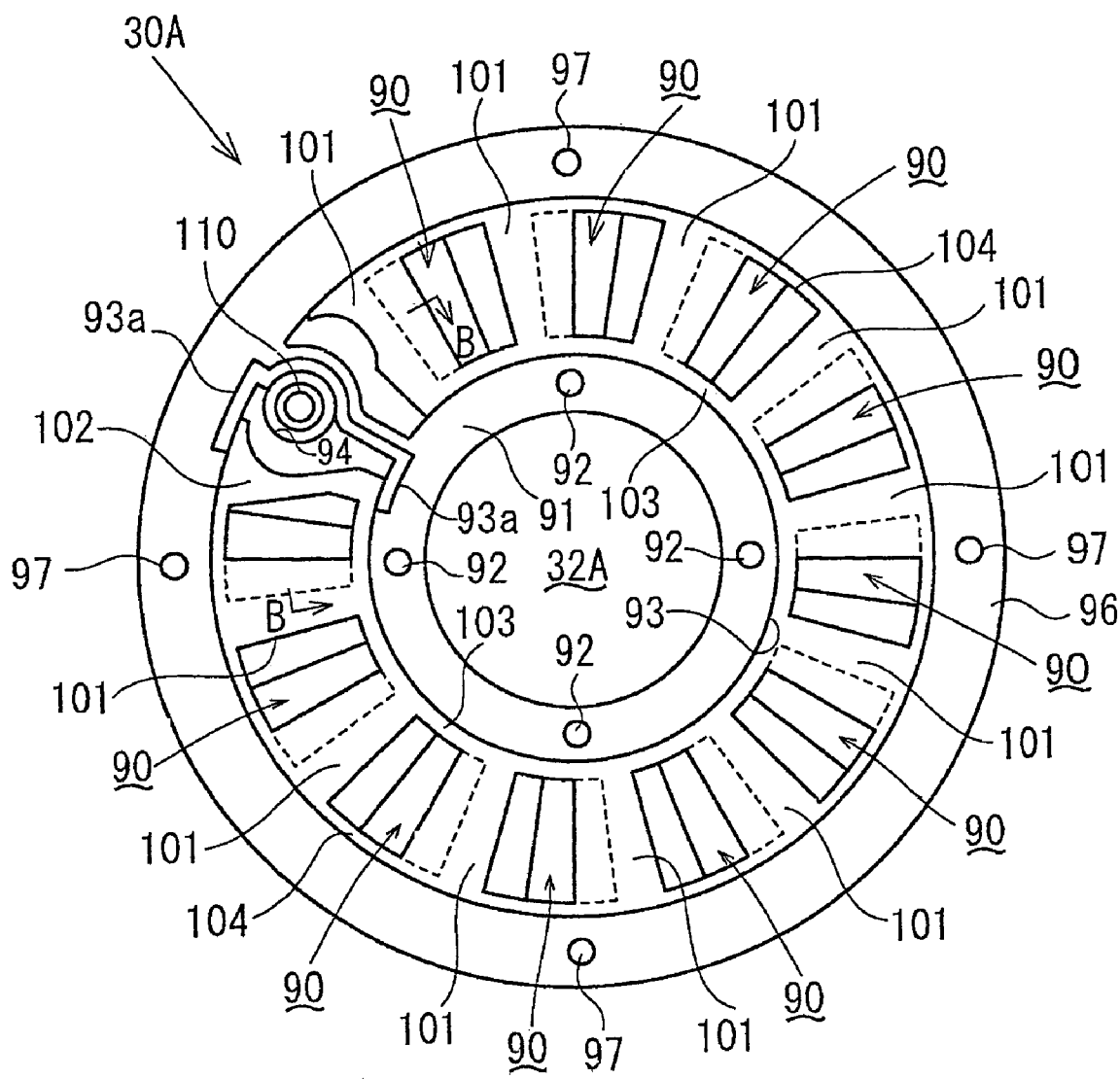
FIG. 28 is a plan view of the retainer illustrating operation of the airbag apparatus of FIG. 22.
Figure 29:
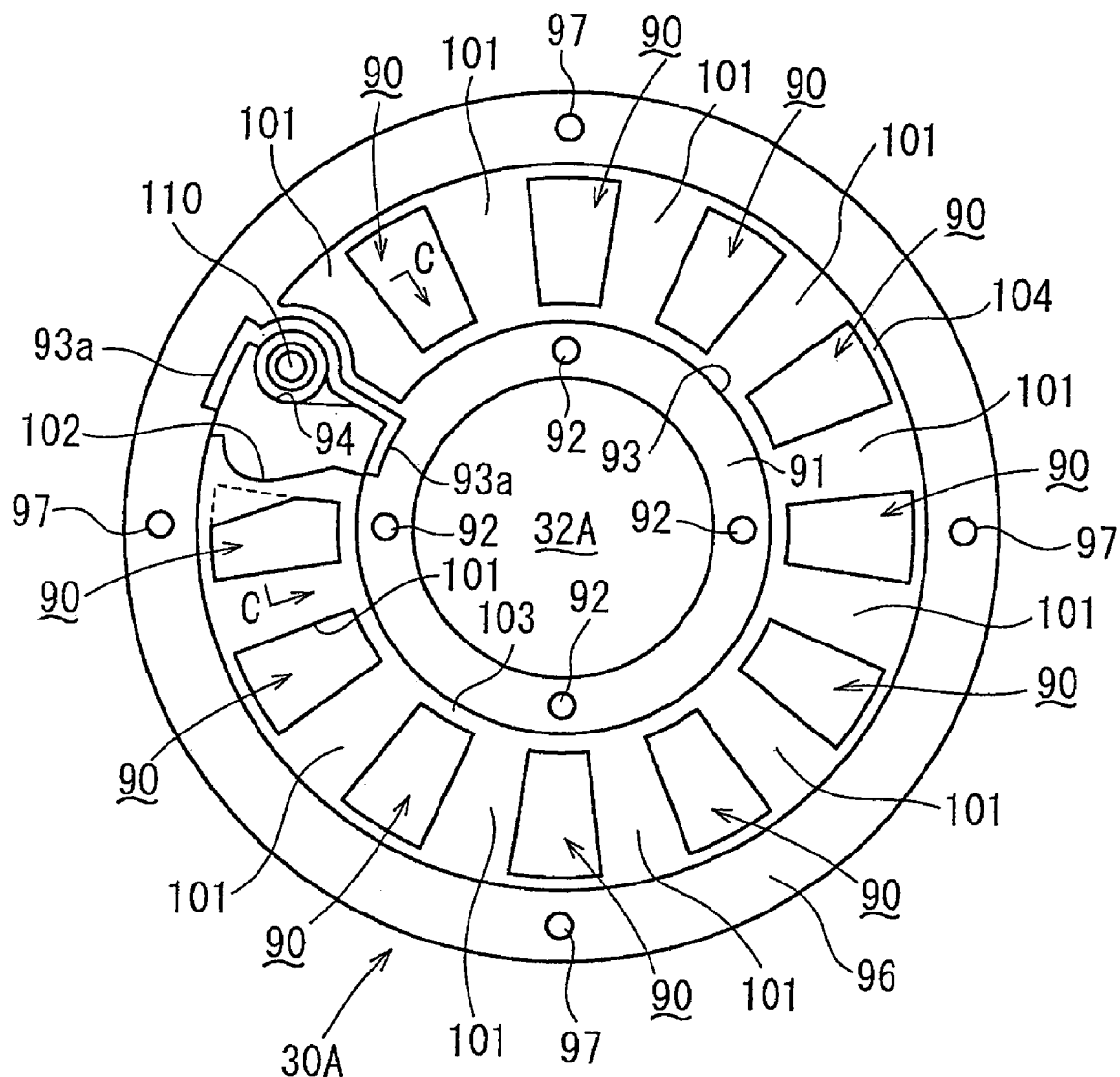
FIG. 29 is a plan view of the retainer illustrating the operation of the airbag apparatus of FIG. 22.
Figure 30A:
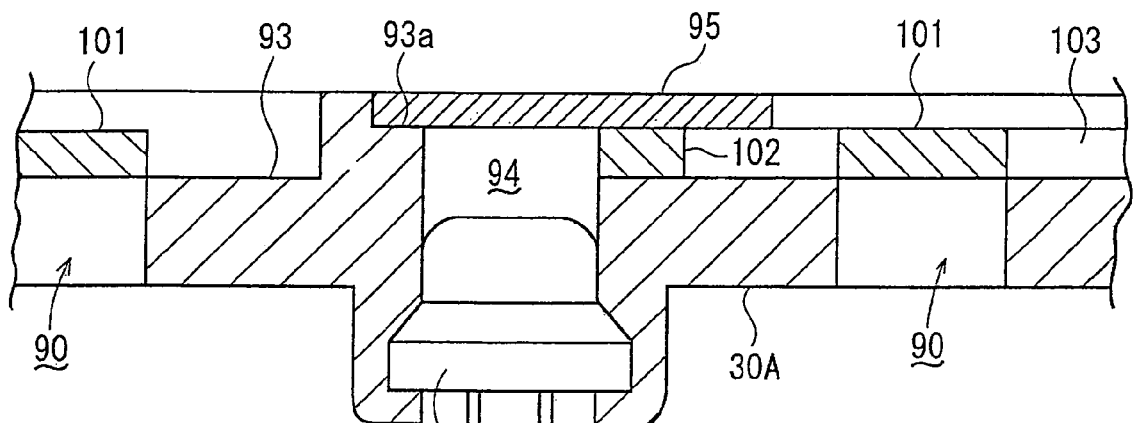
FIGS. 30(a) through 30(c) are plan views of the retainer illustrating the operation of the airbag apparatus of FIG. 22.
Figure 30B:
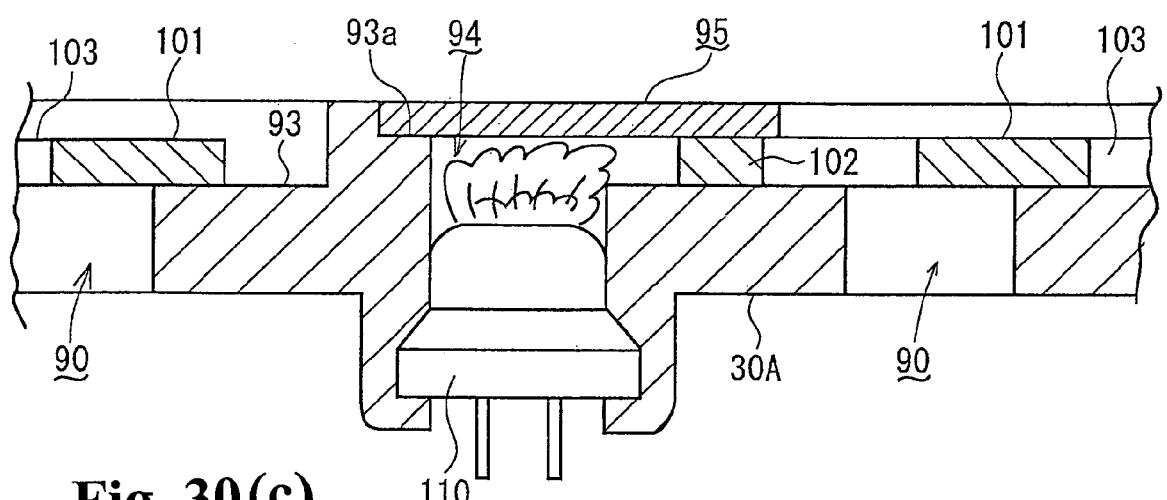
Figure 30C:
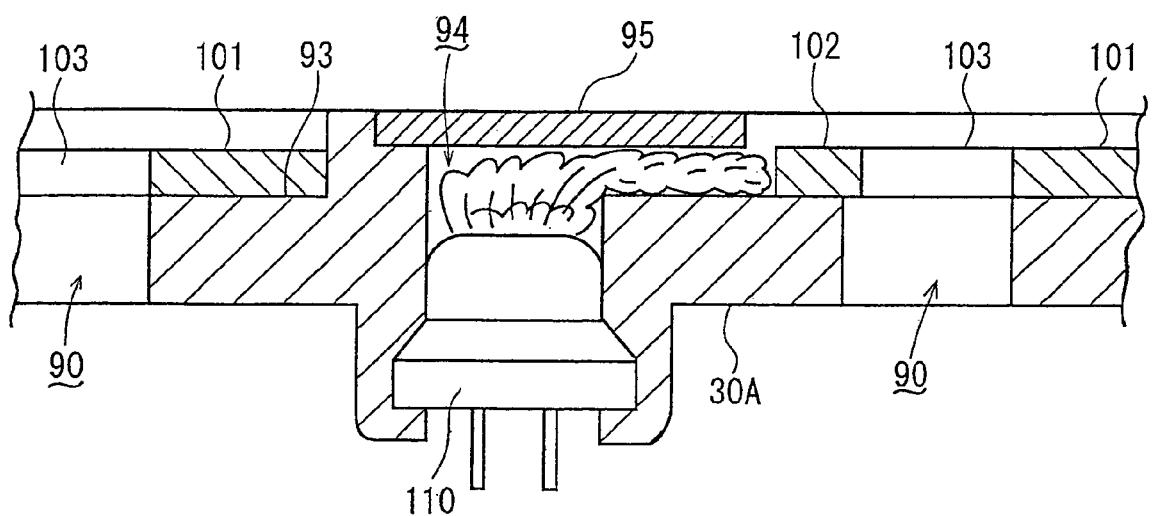

FIGS. 22 and 23 are cross-sections illustrating an airbag and an airbag apparatus according to a tenth embodiment of the invention, in each of the cases when the airbag is in the middle of an expansion and on completion of the expansion, respectively. FIG. 24 is an exploded perspective view illustrating the airbag apparatus; FIG. 25 is an exploded perspective view illustrating a retainer of the airbag apparatus; FIG. 26 is a perspective view illustrating the retainer; FIGS. 27 through 29 are plan views illustrating each of the closed state of the opening for vent 90, a state of the opening for vent 90 in the middle of being opened, and a state of the opening for vent 90 on completion of being opened, respectively; and FIGS. 30(a) through 30(c) are cross-sections along the lines A-A, B-B, C-C of each of FIGS. 27 through 29, respectively.

The airbag apparatus is provided with an airbag 10C whose inner part is partitioned into the first chamber 1 at a center thereof and the second chamber 2 surrounding the first chamber 1, a retainer 30A to which the airbag C is attached, an opening for vent 90 serving as a gas-discharging device to be communicated with the second chamber 2 and is provided in the retainer 30A, a lid member 100 serving as a limiting device for limiting gas-discharging operation performed by the opening for vent 90, the inflator 36 for expanding the airbag 10C, and the like. In this embodiment, the airbag 10C is also the airbag for use in the driver-side seat of the motor vehicle.

In this embodiment, the airbag 10C is also provided with a front panel 12 constituting a face of the airbag facing the occupant, a rear panel 14 constituting an outer face of the airbag opposite to the face facing the occupant, the first and second inner panels 22A and 22B, respectively partitioning the inner part of the airbag 10C into the first chamber 1 and the second chamber 2, and the like.

Similar to each of the embodiments described above, each of the outer peripheral edge portions of the front panel 12 and the rear panel 14 is stitched together and an outline of the bag-shaped airbag 10C is thereby formed. Inside of the airbag 10C, the first and second inner panels 22A and 22B are disposed. A central portion of the first inner panel 22A (a portion to be an occupant side of an end portion of the first inner panel 22A, when the airbag 10C is expanded) is stitched on the center portion of the front panel 12 by the seam 23A and the outer peripheral edge portion of the second inner panel 22B disposed at the rear panel 14 side is stitched on the outer peripheral edge portion of the first inner panel 22A by the seam 23B.

In this embodiment, an attaching-opening 16A for the retainer 30A is formed at a center of the rear panel 14 and a bolt penetrating hole 20A to be penetrated by the stud bolt 44 of an out side pressing ring 42A, described later, is provided around the attaching-opening 16A. Further, at a center of the second inner panel 22B at the rear panel 14 side, the opening for inflator 24 is formed, and the bolt penetrating hole 26 to be penetrated by the stud bolt 44 of an inner pressing ring 42B, described later, is formed around the opening 24. The attaching-opening 16A has a diameter larger than that of the opening for inflator 24.

The opening for inflator 24 is disposed inside of the attaching-opening 16A at a distance in an approximately concentric manner and a peripheral edge portion of the attaching-opening 16A is pressed to the retainer 30A by the out side pressing ring 42A having a relatively large diameter. Further, the peripheral edge portion of the opening for inflator 24 is pressed to the retainer 30A by the inner pressing ring 42B having a relatively small diameter. Accordingly, the inner part of the airbag 10C is partitioned into a first chamber 1 at a center (inside of the first and second inner panels 22A and 22B) and the second chamber 2 surrounding the first chamber 1 by the first and second inner panels 22A and 22B.

Further, in this embodiment, the continuous opening 27 for allowing the first chamber 1 to communicate with the second chamber 2 is provided in the second inner panel 22B, at a position relatively close to the opening for inflator 24. In addition, the inner venthole 28 is provided at the first inner panel 22A. Similar to each of the embodiments described above, the continuous opening 27 is formed on an extension line in a gas blowing out direction of the inflator 36, namely, at a position facing the gas blowing outlet 36a of the inflator 36.

The retainer 30A, to which the airbag 10C is attached has approximately a disk shape, in this embodiment. An inflator-attaching opening 32A is formed at a center of the retainer 30A, and a periphery of the inflator-attaching opening 32A serves as an inner panel attaching portion 91. The inflator-attaching opening 32A has an approximately the same diameter as that of the opening for inflator 24 of the second inner panel 22B. A bolt penetrating hole 92 is provided in the inner panel attaching portion 91 in an overlapping positional relationship with the bolt penetrating hole 26 of the second inner panel 22B.

A guide groove 93 (refer to FIG. 25) having approximately a C-shape is provided in a manner so as to orbit the periphery of the inner panel attaching portion 91. The guide groove 93 is configured to guide a movement of a lid member 100 when the opening for vent 90 is opened. In this embodiment, at a bottom of the guide groove 93, the plurality of openings for vent 90 are formed at a predetermined distance in a peripheral direction of the guide groove 93. Each of the openings for the vent 90 allows an inner part of the guide groove 93 (front face of the retainer 30A) to communicate with a rear side of the retainer 30A penetrating the retainer 30A.

At one end side of the guide groove 93, a gas generator 110 serving as a lid member moving device is disposed. In detail, a gas blowing outlet 94 (refer to FIGS. 25 and 30) is disposed at a bottom of the one end side of the guide groove 93 and the gas generator 110 is installed at an inside of the gas blowing outlet 94. Further, the gas generator 110 is connected to a controller (not shown) and is activated to blow out the gas by an activation signal from the controller, when the airbag 10C is expanded more than the predetermined amount.

A cover 95 is loaded in a manner so as to cover the one end side of the guide groove 93. The gas blowing outlet 94 is disposed at a rear side of the cover 95. Further, at a corner edge portion of one end side of the guide groove 93 and an upper face of the retainer 30A, a concave step portion 93a (in FIG. 25) for receiving an outer edge portion of the cover 95 is formed. In addition, when the cover 95 is installed, the outer edge portion of the cover 95 is engaged with the concave step portion 93a and thereby, the location of an upper face of the cover 95 is brought to be in the plane of an upper face of the retainer 30A. As illustrated in FIG. 30, a pressure receiving piece 102, described later, is inserted in between the cover 95 and a bottom face of the guide groove 93.

An outer periphery side of the retainer 30A positioned outward from the guide groove 93 serves as a rear panel attaching portion 96. A diameter of an inner periphery of the rear panel attaching portion 96 (a diameter of an outer periphery of the guide groove 93) is approximately the same as a diameter of the attaching opening 16A of the rear panel 14. In the rear panel attaching portion 96, a bolt penetrating hole 97 is disposed in overlapping positional relationship with the bolt penetrating hole 20A of the rear panel 14.

The lid member 100 is provided with a plurality of lid plates 101 (in the same number as that of the opening for vent 90, in this embodiment), the pressure receiving piece 102 for receiving gas pressure from the gas generator, and a pair of C-shaped frames 103 and 104 that integrally hold the plurality of lid plates 101 and the pair of pressure receiving pieces 102. The frame 103 is disposed at an inner periphery side of the guide groove 93 and the frame 104 is disposed at an outer periphery side of the guide groove 93. A length in a peripheral direction of the frames 103 and 104 is configured to be shorter than that of the guide groove 93. The pressure receiving piece 102 and each of the lid plates 101 are provided in a manner so as to be respectively tacked across the frames 103 and 104.

Further, as illustrated in FIG. 25, the pressure receiving piece 102 is disposed in a manner so as to bridge each of one ends of the frames 103 and 104 to the other ends thereof. Each of the lid plates 101 has approximately the same size and the same shape as those of each of the openings for vent 90 in this embodiment, and is disposed in a peripheral direction of the frames 103 and 104 at approximately the same distance as that between each of the openings for vent 90 and 90.

The lid member 100 is disposed in the guide groove 93 to be movable in an extending direction (peripheral direction) of the guide groove 93. In the lid member 100, the pressure receiving piece 102 is inserted into the rear side of the cover 95 and facing the gas blowing outlet 94 in the initial state (non-activation state of the airbag 10C), as illustrated in FIGS. 26, 27, and 30(a). Further, at this moment, the lid plates 101 cover each of the corresponding openings for vent 90.

The inflator 36 has the same configuration as that illustrated in FIGS. 1 through 4 and the tip end thereof is fit into the inflator-attaching opening 32A of the retainer 30A.

When the airbag 10C is attached to the retainer 30A, the opening for inflator 24 of the second inner panel 22B is disposed at the inflator-attaching opening 32A in an approximately concentric manner and the peripheral edge portion of the opening for inflator 24 is pressed to the inner panel attaching portion 91 by the inner pressing ring 42B. At this moment, the tip end of the inflator 36 fit into the inflator-attaching opening 32A is inserted into the first chamber 1 via the opening for inflator 24 and each of the gas blowing outlets 36a of the inflator 36 faces each of the continuous openings 27 of the second inner panel 22B.

When the pressure ring 42B is overlapped with the peripheral edge portion of the opening for inflator 24, each of the stud bolts 44 of the pressure ring 42B penetrates each of the bolt penetrating holes 26 and 92 of the second inner panel 22B and the inner panel attaching portion 91, respectively, and the bolt penetrating hole 40 formed in the flange 38 of the inflator 36. In addition, the nuts 46 are screwed on the stud bolts 44, and the pressing ring 42B, the second inner panel 22B, and the inflator 36 are fixed to the retainer 30A.

Further, the attaching-opening 16A of the rear panel 14 is disposed along the outer periphery of the guide groove 93 and the peripheral edge portion of the attaching-opening 16A is pressed to the rear panel attaching portion 96 by the out side pressing ring 42A. At this moment, each of the stud bolts 44 of the out side pressing ring 42A penetrates each of the bolt penetrating holes 20A and 97 of the rear panel 14 and the rear panel attaching portion 96, respectively. In addition, the nuts 46 are threaded on the stud bolts 44, and the pressing ring 42A and the rear panel 14 are fixed to the retainer 30A.

Consequently, the opening for vent 90 is disposed in between the attaching-opening 16A and the opening for inflator 24 and the second chamber 2 is allowed to communicate with the opening for vent 90.

Thereafter, the airbag apparatus is formed by installing the module cover 48A on the retainer 30A in a manner so as to cover the folded body of the airbag 10C.

Aspects of the configuration other than that in this embodiment of the airbag apparatus are identical to those illustrated in FIGS. 1 through 4, and the same reference numbers in FIGS. 22 through 30 denote the same elements in FIGS. 1 through 4.

Next, operation of this airbag apparatus will be explained.

In the event the motor vehicle encounters a crash, the inflator 36 is activated and the gas is blown out into the inside of the airbag 10C. The airbag 10C is expanded by the gas and pushes open the module cover 48A. Then, the airbag 10C is deployed into a chamber of the motor vehicle and protects the occupant seated on the driver-side seat.

In this airbag apparatus, at an initial stage of the expansion of the airbag 10C, the opening for vent 90 is closed by the lid member 100 (lid plate 101) and because the gas is not discharged from the opening for vent 90, the second chamber 2 is promptly brought to be in high inner pressure. The airbag 10C thereby promptly develops.

Further, in this embodiment, because the continuous opening 27 is disposed on the extension line in the gas blowing out direction of the inflator 36, the gas blown out from the inflator 36 is blown out toward a region adjacent to the continuous opening 27 in a manner of direct projection and is flowing into the second chamber 2 from the continuous opening 27. Thereby, the gas blown out from the inflator 36 is brought to be flowing into the second chamber 2 and the second chamber 2 is brought to be in a high inner pressure at an extremely early time. As a result, the development of the airbag 10C is further accelerated.

When the airbag 10C is expanded more than the predetermined amount, the activation signal is input into the gas generator 110 from the controller (not shown) and the gas generator 110 is activated to blow out the gas. Then, the gas is blown out from the gas blowing outlet 94. Further, gas pressure affects the pressure receiving piece 102 of the lid member 100 and, as illustrated in FIGS. 30(a) through 30(c), the entire lid member 100 is pressed by the gas and is moved (rotated) to the other end side of the guide groove 93 (in a direction to be separated from the gas blowing outlet 94). Thereby, each of the lid plates 101 is retreated from the opening for vent 90 and the opening for vent 90 is opened.

When the occupant of the motor vehicle hits the airbag 10C, the gas is discharged to the second chamber 2 from the first chamber 1 via the inner venthole 28 and is further discharged outside of the airbag 10C from the second chamber 2 via each of the openings for vent 90. The shock applied to the occupant of the vehicle is thereby absorbed.

Further, in this embodiment, at the initial stage of the expansion of the airbag 10C, although all the openings for vent 90 are closed by the lid plate 101, openings for vent 90 without being closed by the lid plate 101 may exist.

In each of the aforementioned embodiment, illustrated in FIGS. 8 through 17, and 22 through 30, the lid members 60B through 60E, or each of the lid plates 101 may be configured to have an auxiliary venthole or an auxiliary opening for venting as the embodiment illustrated in FIG. 7.

While the invention has been described with reference to each of the embodiments, the description is illustrative of the invention and is not to be construed as limiting the invention.

The present invention is also applicable to an airbag whose inner part is partitioned into more than two chambers.

The disclosures of Japanese Patent Applications No. 2005-051184 filed on Feb. 25, 2005, and No. 2005-123941 filed on Apr. 21, 2005, are incorporated herein.

What is claimed is:

1. An airbag, comprising:
    an outer panel for forming the airbag;
    an inner panel disposed inside the outer panel and partitioning an inner part of the outer panel into a plurality of chambers;
    a gas-discharging device for absorbing a shock by discharging gas from at least one of the chambers to an outside of the chamber, said gas discharging device comprising a venthole which has an essentially constant shape and size; and
    a limiting device for limiting the gas discharge by the gas-discharging device via the venthole until the chamber is expanded more than a predetermined amount, said limiting device comprising an attaching portion and a lid member which is in contact with and guided by the attaching portion in a manner wherein the lid member is maintained in a position with respect to the venthole by the attaching portion to maintain the venthole effectively closed until the lid member is moved with respect to the attaching portion in response to the chamber being expanded by more than a predetermined amount.

2. The airbag according to claim 1, wherein the lid member enables the venthole to be substantially closed until the chamber is expanded more than the predetermined amount, and enables the venthole to be substantially open when the chamber is expanded more than the predetermined amount.

3. The airbag according to claim 2, further comprising a panel for providing the partitioning,
    wherein the lid member is connected to the panel, is releasably combined with the airbag in a vicinity of the venthole, and covers the venthole so that when the airbag is expanded more than the predetermined amount, the lid member is stretched by the panel so as to release the lid member from the vicinity of the venthole and to enable the venthole to be substantially open.

4. An airbag partitioned into a plurality of chambers in an inner part thereof, comprising:
    a venthole as a gas-discharging device for absorbing a shock by discharging gas from at least one of the chambers to an outside of the chamber,
    a limiting device for limiting the gas discharge by the gas-discharging device until the chamber is expanded more than a predetermined amount, and
    a panel for providing the partitioning,
    wherein the limiting device is a lid member for enabling the venthole to be substantially closed until the chamber is expanded more than the predetermined amount, and for enabling the venthole to be substantially open when the chamber is expanded more than the predetermined amount,
    the lid member is connected to the panel, is releasably combined with the airbag in a vicinity of the venthole, and covers the venthole so that when the airbag is expanded more than the predetermined amount, the lid member is stretched by the panel so as to release the lid member from the vicinity of the venthole and to enable the venthole to be substantially open, and
    the lid member is releasably combined with the vicinity of the venthole by a tear seam.

5. The airbag according to claim 2,
    wherein the lid member is connected to the inner panel and covers the venthole so that when the airbag is expanded more than the predetermined amount, the lid member is stretched and retreats from the venthole so as to enable the venthole to be substantially open.

6. The airbag according to claim 5, wherein the venthole extends lengthwise in a retreating direction of the lid member.

7. The airbag according to claim 1,
    wherein the venthole has a pair of longitudinal sides, and the panel is connected to a middle part of one side of the longitudinal sides of the venthole so that when the airbag is expanded more than the predetermined amount, the middle part of the one side of the longitudinal sides of the venthole is stretched by the panel so as to substantially open the venthole.

8. The airbag according to claim 7, wherein the venthole has a groove-like shape or elongated-hole shape.

9. An airbag apparatus comprising:
    an airbag; and
    an inflator for supplying gas to the airbag,
    wherein the airbag is the airbag according to claim 1.

10. An airbag apparatus comprising:
    an airbag partitioned into a plurality of chambers in an inner part thereof;
    a rigid retainer to which the airbag is attached;
    an inflator for supplying gas to the airbag, the inflator being connected with the rigid retainer;
    a gas-discharging device for absorbing a shock by discharging gas to an outside of the airbag, the gas-discharging device being provided in the rigid retainer and being in communication with at least one of the chambers; and
    a limiting device for limiting the gas discharge via the gas-discharging device until the chamber is expanded more than a predetermined amount.

11. The airbag apparatus according to claim 10, wherein the gas-discharging device comprises:
    an opening provided in the retainer, and the limiting device comprises a lid member disposed and positioned on the opening for enabling the opening to be substantially closed until the chamber is expanded more than the predetermined amount, and for enabling the opening to be substantially open when the chamber is expanded more than the predetermined amount.

12. The airbag apparatus according to claim 11, wherein the lid member covers the opening until the chamber is expanded more than the predetermined amount.

13. The airbag apparatus according to claim 12, further comprising a lid member moving device for moving the lid member so as to substantially open the opening when the airbag is expanded more than the predetermined amount.

14. The airbag apparatus according to claim 13, wherein the lid member moving device comprises a gas generator for moving the lid member by applying gas pressure to the lid member.

15. The airbag according to claim 1, wherein the attaching portion and the lid member are configured to slide against one another.

16. The airbag according to claim 1, wherein the attaching portion is permanently connected to a portion of the airbag which forms a portion of one of said plurality of chambers.

17. The airbag according to claim 1, wherein the attaching portion is permanently connected with a rigid retainer to which an inflator is connected and wherein the lid member is rotatably disposed in the attachment portion.

18. The airbag apparatus according to claim 11, wherein the limiting device comprises a rotatable member which has at least one opening configured to come into register with the opening in the retainer through which gas can vent from the apparatus upon a predetermined amount of rotation of the member.

19. The airbag apparatus according to claim 18, wherein the rotatable member is configured to be driven to rotate by the gas flow emitted from the gas discharging device.

* * * * *